(12) United States Patent
Judge et al.

(10) Patent No.: US 9,382,943 B2
(45) Date of Patent: Jul. 5, 2016

(54) COMPACT SLIDE ASSEMBLIES

(75) Inventors: Ronald J. Judge, Corona, CA (US);
Gaetano Giovanni Galletti, Costa Mesa, CA (US)

(73) Assignee: Jonathan Manufacturing Corporation, Irvine, CA (US)

( * ) Notice: Subject to any disclaimer, the term of this patent is extended or adjusted under 35 U.S.C. 154(b) by 0 days.

(21) Appl. No.: 13/222,935

(22) Filed: Aug. 31, 2011

(65) Prior Publication Data

US 2012/0057812 A1 Mar. 8, 2012

Related U.S. Application Data

(60) Provisional application No. 61/378,786, filed on Aug. 31, 2010, provisional application No. 61/411,436, filed on Nov. 8, 2010, provisional application No. 61/414,362, filed on Nov. 16, 2010.

(51) Int. Cl.
*A47B 88/00* (2006.01)
*F16C 29/04* (2006.01)

(52) U.S. Cl.
CPC ............ *F16C 29/048* (2013.01); *F16C 29/045* (2013.01); *F16C 2204/20* (2013.01); *F16C 2220/48* (2013.01)

(58) Field of Classification Search
CPC ..... H05K 7/1489; A47B 88/044; A47B 88/10
USPC ................. 312/334.11, 334.17, 334.7, 334.8, 312/332.32, 332.33, 334.38, 330.1, 334.4, 312/334.5
See application file for complete search history.

(56) References Cited

U.S. PATENT DOCUMENTS

| 1,736,108 | A | | 11/1929 | Anderson | |
|---|---|---|---|---|---|
| 3,141,714 | A | | 7/1964 | Valitus | |
| 3,142,517 | A | | 7/1964 | Ward | |
| 3,177,047 | A | * | 4/1965 | Mutchnik et al. | 312/308 |
| 3,292,985 | A | | 12/1966 | Buhrmaster | |
| 3,371,968 | A | * | 3/1968 | Loake | 384/18 |
| 3,975,063 | A | * | 8/1976 | Mahotka et al. | 384/18 |
| 4,080,686 | A | * | 3/1978 | Hagen | 16/88 |
| 4,112,539 | A | * | 9/1978 | Hagen | 16/88 |
| 4,549,773 | A | | 10/1985 | Papp et al. | |
| 4,560,212 | A | | 12/1985 | Papp et al. | |
| 4,749,242 | A | * | 6/1988 | Rechberg | 312/333 |
| 4,961,648 | A | | 10/1990 | Rock | |
| 5,033,805 | A | | 7/1991 | Hobbs | |

(Continued)

FOREIGN PATENT DOCUMENTS

| DE | 202009007522 | * | 8/2009 |
|---|---|---|---|
| DE | 202009007022 | * | 9/2009 |

*Primary Examiner* — Daniel J Troy
*Assistant Examiner* — Kimberley S Wright
(74) *Attorney, Agent, or Firm* — Knobbe, Martens, Olson & Bear LLP

(57) ABSTRACT

Slide assemblies that include at least an inner slide segment and an outer slide segment. Many of the slide assemblies also include an intermediate slide segment interposed between the inner slide segment and the outer slide segment. One or more of the segments can be constructed of an aluminum material, which is extruded into a final cross-sectional shape. A slide assembly can include a combination drop-and-lock and disconnectable inner slide segment. A slide assembly can include a lock closed arrangement having a lock arm that passes through an opening of a mounting rail of the server rack. A slide assembly can also include a self-resetting hands-free disconnect arrangement.

14 Claims, 31 Drawing Sheets

(56) References Cited

U.S. PATENT DOCUMENTS

| | | | |
|---|---|---|---|
| 5,344,228 A * | 9/1994 | Kovarik et al. | 312/334.9 |
| 5,484,197 A | 1/1996 | Hansen et al. | |
| 5,571,256 A * | 11/1996 | Good et al. | 211/26 |
| 6,209,979 B1 * | 4/2001 | Fall et al. | 312/330.1 |
| 6,269,959 B1 | 8/2001 | Haworth | 211/26 |
| 6,422,399 B1 * | 7/2002 | Castillo et al. | 211/26 |
| 6,609,619 B2 * | 8/2003 | Abbott | 211/26 |
| 6,702,412 B2 * | 3/2004 | Dobler et al. | 312/334.5 |
| 6,749,275 B2 * | 6/2004 | Cutler et al. | 312/334.4 |
| 6,773,080 B2 * | 8/2004 | Chen et al. | 312/265.1 |
| 6,830,300 B2 * | 12/2004 | Lauchner | 312/334.5 |
| 6,851,773 B2 | 2/2005 | Chen et al. | |
| 6,854,816 B2 * | 2/2005 | Milligan | 312/334.11 |
| 6,860,575 B2 | 3/2005 | Chen et al. | |
| 6,883,884 B2 * | 4/2005 | Chen et al. | 312/333 |
| 6,929,336 B2 * | 8/2005 | Liu et al. | 312/223.1 |
| 6,935,710 B2 | 8/2005 | Chen et al. | |
| 6,962,397 B2 * | 11/2005 | Dobler et al. | 312/333 |
| 6,976,745 B2 * | 12/2005 | Dobler et al. | 312/334.44 |
| 7,134,802 B2 * | 11/2006 | Doerr et al. | 403/322.1 |
| 7,144,184 B1 * | 12/2006 | Tsai | 403/350 |
| 7,188,916 B2 * | 3/2007 | Silvestro et al. | 312/334.4 |
| 7,281,633 B2 * | 10/2007 | Hartman et al. | 211/26 |
| 7,281,694 B2 * | 10/2007 | Allen et al. | 248/244 |
| 7,303,361 B1 * | 12/2007 | Lane | 405/287 |
| 7,318,532 B1 * | 1/2008 | Lee et al. | 211/26 |
| 7,357,362 B2 * | 4/2008 | Yang et al. | 248/221.11 |
| 7,364,244 B2 * | 4/2008 | Sandoval | 312/333 |
| 7,552,899 B2 * | 6/2009 | Chen et al. | 248/224.8 |
| 7,604,308 B2 * | 10/2009 | Tseng et al. | 312/333 |
| 7,641,297 B2 * | 1/2010 | Huang | 312/334.4 |
| 7,694,926 B2 * | 4/2010 | Allen et al. | 248/244 |
| 7,731,142 B2 * | 6/2010 | Chen et al. | 248/244 |
| 7,798,582 B2 * | 9/2010 | Yu et al. | 312/334.4 |
| 7,967,399 B1 * | 6/2011 | Baiza et al. | 312/223.1 |
| 7,992,950 B2 * | 8/2011 | Lauchner | 312/334.5 |
| 8,104,626 B2 * | 1/2012 | Huang et al. | 211/26 |
| 8,272,783 B2 * | 9/2012 | Mochizuki et al. | 384/18 |
| 8,317,278 B2 * | 11/2012 | Enos | 312/333 |
| 8,353,494 B2 * | 1/2013 | Peng et al. | 248/298.1 |
| 8,371,454 B2 * | 2/2013 | Chen et al. | 211/26 |
| 8,403,432 B2 * | 3/2013 | Chen et al. | 312/333 |
| 8,534,775 B1 * | 9/2013 | Liang | 312/223.1 |
| 2001/0017760 A1 * | 8/2001 | Baertsoen | 361/679 |
| 2001/0035704 A1 * | 11/2001 | Dierbeck | 312/902 |
| 2001/0040203 A1 * | 11/2001 | Brock et al. | 248/222.11 |
| 2003/0141791 A1 * | 7/2003 | Dubon et al. | 312/333 |
| 2004/0056572 A1 * | 3/2004 | Chen et al. | 312/333 |
| 2004/0120106 A1 * | 6/2004 | Searby et al. | 361/683 |
| 2006/0152115 A1 * | 7/2006 | Dubon et al. | 312/334.8 |
| 2008/0036347 A1 * | 2/2008 | Liang | 312/334.5 |
| 2008/0053933 A1 * | 3/2008 | Allen et al. | 211/90.01 |
| 2008/0073469 A1 * | 3/2008 | Mushan et al. | 248/205.1 |
| 2008/0122333 A1 * | 5/2008 | Tseng et al. | 312/333 |
| 2009/0250421 A1 * | 10/2009 | Wang et al. | 211/183 |
| 2009/0283652 A1 * | 11/2009 | Chen et al. | 248/298.1 |
| 2009/0294393 A1 * | 12/2009 | Chen et al. | 211/175 |
| 2012/0292274 A1 * | 11/2012 | Lin et al. | 211/86.01 |
| 2013/0026113 A1 * | 1/2013 | Fan et al. | 211/26 |
| 2013/0056432 A1 * | 3/2013 | Lin et al. | 211/123 |

* cited by examiner

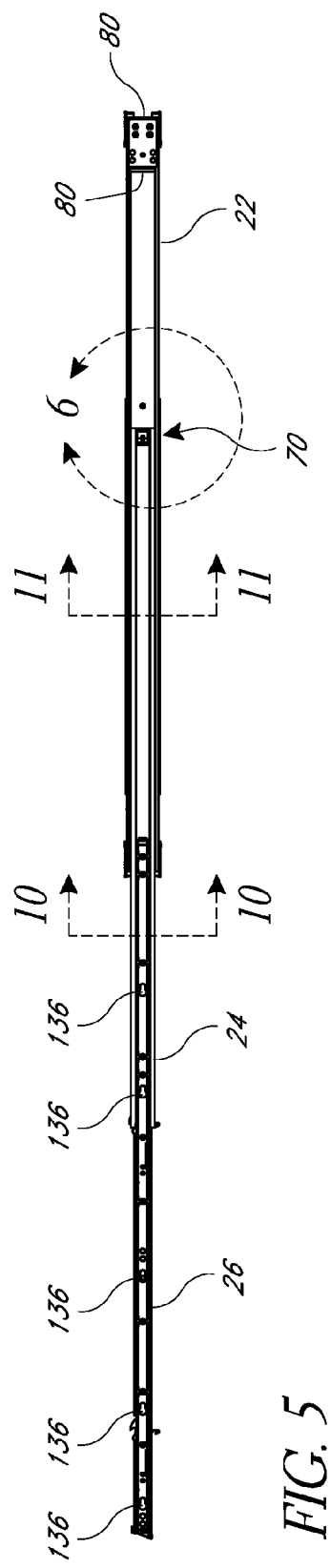
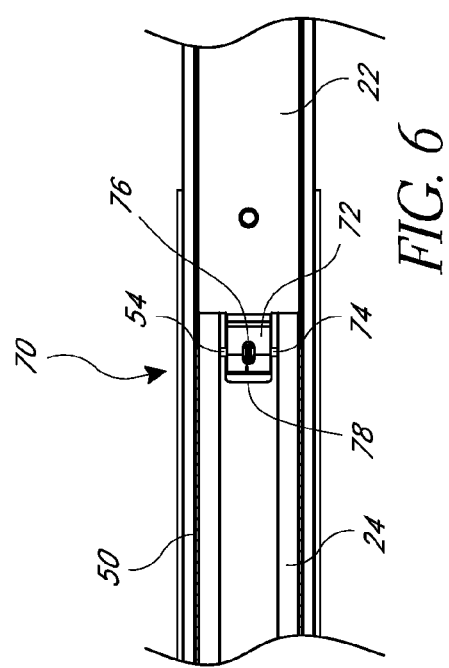
FIG. 5
FIG. 6

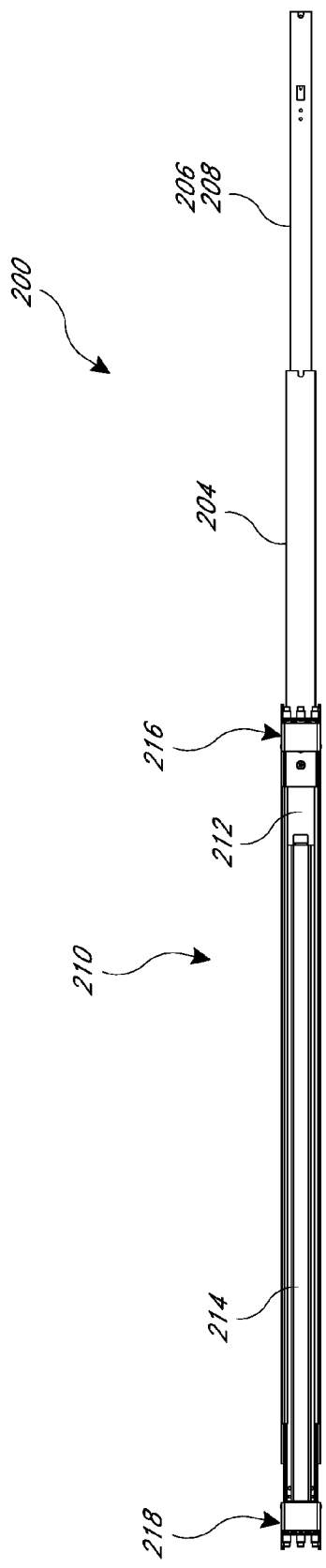
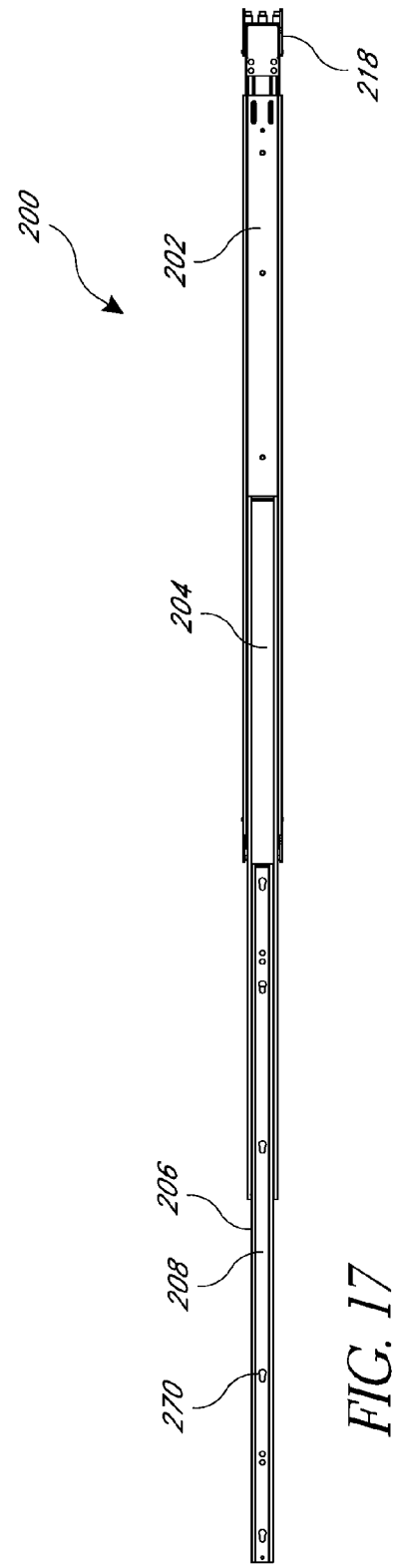
FIG. 16
FIG. 17

COMPACT SLIDE ASSEMBLIES

RELATED APPLICATIONS

Related applications are listed in an Application Data Sheet (ADS) filed with this application. The entirety of each application listed in the ADS is hereby incorporated by reference herein.

BACKGROUND OF THE INVENTION

1. Field of the Invention

The present invention generally relates to slide assemblies. In particular, the present invention relates to slide assemblies having a compact cross-sectional size.

2. Description of the Related Art

Slide assemblies are often used to support a computer server within an enclosure or rack. The slide assembly permits the server to be extended from the rack to promote access to the server for maintenance, replacement or the like. The server enclosure or rack typically includes a vertical support rails at each corner. A pair of slide assemblies are mounted to the vertical support rails on opposing sides of the enclosure. The pair of slide assemblies movably support opposing sides of a computer server.

The vertical support rails of the server rack typically include a plurality of openings, or mounting holes, spaced along the height of the support rail, which permit the slide assemblies to be coupled to the vertical support rails at any of a number of possible locations. Typically, a bracket will be connected to each end of the slide assembly and act as an interface between the slide assembly and the vertical support rails of the rack.

Although slide assemblies have been in use for a significant period of time, there is a demand for continued improvement in the design and operation of slide assemblies, especially in slide assemblies intended for use in computer server or other electronic equipment applications. For example, there is a constant push to reduce the cross-sectional size of the slide assemblies, while retaining functionality or even improving the functionality of the slide assemblies. In addition, there is a demand for improved mounting arrangements, which permit the slide assemblies to be mounted to a server rack. Often, it is desirable for the mounting arrangements to adjust in size quickly and easily, and mount to the server rack without the use of tools. There is also a demand for secure locking arrangements that can maintain the slide assemblies in a closed position in response to a variety of external forces, such as movement of the server rack, including movement over bumps likely to be encountered on a surface (e.g., a door threshold).

SUMMARY OF THE INVENTION

An embodiment of a slide assembly includes an outer slide segment having a first bearing surface and a second bearing surface. At least one intermediate slide segment is telescopically engaged with the outer slide segment. The at least one intermediate slide segment has a first bearing surface and a second bearing surface. An inner slide segment is telescopically engaged with the at least one intermediate slide segment. The inner slide segment has a first bearing surface and a second bearing surface. The first and second bearing surfaces of each slide segment carry a load applied by the other slide segments. At least one of the slide segments is constructed from an aluminum material and shaped into a desired cross-sectional shape by a precision extrusion process such that the bearing surfaces of the at least one of the slide segments are extruded into a finished shape. A wall thickness of upper and lower portions that define the bearing surfaces is greater than a wall thickness of a web portion extending between the upper and lower portions.

An embodiment of a combination drop-and-lock and disconnect slide assembly includes a first slide segment having a first bearing surface and a second bearing surface. The first slide segment further includes an opening. A second slide segment is telescopically engaged with the first slide segment. The second slide segment has a first bearing surface and a second bearing surface. The first and second bearing surfaces of the first and second slide segments carry a load applied to the slide assembly. The second slide segment includes a plurality of slots each configured to receive a mounting pin of an object to be carried by the slide assembly. Each of the plurality of slots includes an open end and a closed end. A drop-and-lock arrangement is associated with at least one of the plurality of slots. The lock arrangement includes a lock arm secured to the second slide segment. The lock arm permits the mounting pin to move from an open end to a closed end of the at least one slot and inhibits the mounting pin from being removed from the closed end of the slot. The lock arm is selectively movable to a released position to allow the mounting pin to be removed from the slot. A disconnect arrangement includes a disconnect lock member that is normally biased into engagement with the opening of the first slide segment when the second slide segment is in an open position with respect to the first slide segment to inhibit further opening movement and removal of the first slide segment. The disconnect lock member can be selectively removed from engagement with the opening to permit the first slide segment to be removed from the second slide segment.

An embodiment of a slide assembly with a lock closed arrangement for mounting a computer server relative to a server rack includes a first slide segment and a second slide segment telescopically engaged with the first slide segment. The second slide segment is configured to support a computer server and is movable between an open position and a closed position relative to the first slide segment. A mounting bracket is coupled to the first slide segment and is connectable to a server rack having a rail with a plurality of mounting holes. The mounting bracket defines an opening that is aligned with one of the plurality of mounting holes when the mounting bracket is connected to the server rack. A lock-closed arrangement includes a lock arm carried by the second slide segment. The lock arm extends through the mounting hole aligned with the opening and includes an engagement portion that engages the opening of the mounting bracket when the second slide segment is in the closed position.

An embodiment of a slide assembly includes a first slide segment and a second slide segment telescopically engaged with one another. The second slide segment is movable between a closed position and an open position relative to the first slide segment. The second slide segment includes a plurality of slots, each of which is configured to receive a mounting pin of a computer server or other object. A locking mechanism corresponds to one or more of the slots and includes spring arm, which can selectively secure the mounting pin within the associated slot. The spring arm includes an opening that is completely surrounded by material of the spring arm and is sized to permit a head of the mounting pin to pass therethrough in a lateral direction. A portion of the spring arm surface defining the opening also defines a stop surface that, when the mounting pin is present within the closed end of the slot, blocks the slot to inhibit removal of the mounting pin from the slot. An upwardly-facing angled tab is configured to be contacted by the head of the mounting pin upon entry of the mounting pin into the slot. The slide assembly also includes a release member configured to selectively release the mounting pin from the slot by moving the spring arm to an open position. The release member includes a ramped contact surface that engages a forwardly-extending angled release tab of the spring arm, which extends in an outboard direction from the remainder of the spring arm. Rearward movement of the release member moves the spring arm toward the open position to allow the mounting pin to be removed from the slot. The spring tension of the spring arm holds the release member via frictional force in a rearward position thus maintaining the spring arm in the open position without any additional biasing or holding arrangement. As the mounting pin is removed from the slot, it contacts the ramped surface and moves the release member back to a forward position, which allows the spring arm to move back to the closed position. In one arrangement, the release member is slidably supported relative to the inner slide segment. In particular, the release member can be supported by a pair of spaced fasteners, such as pins or rivets. The release member can include a plurality of ridges or other roughened surface features to enhance friction during manual movement of the release member.

BRIEF DESCRIPTION OF THE DRAWINGS

These and other features, aspects and advantages of the present slide assemblies are described herein with reference to drawings of certain preferred embodiments, which are provided for the purpose of illustration and not limitation. The drawings contain thirty-four (34) figures.

FIG. 5 is a side view of a second or inboard side of the slide assembly of FIG. 1.

FIG. 6 is an enlarged view of a portion of the slide assembly shown in FIG. 5.

FIG. 16 is a side view of a first or outboard side of the slide assembly of FIG. 14 in an open position.

FIG. 17 is a side view of a second or inboard side of the slide assembly of FIG. 14 in an open position.

DETAILED DESCRIPTION OF THE PREFERRED EMBODIMENTS

Figure 1:
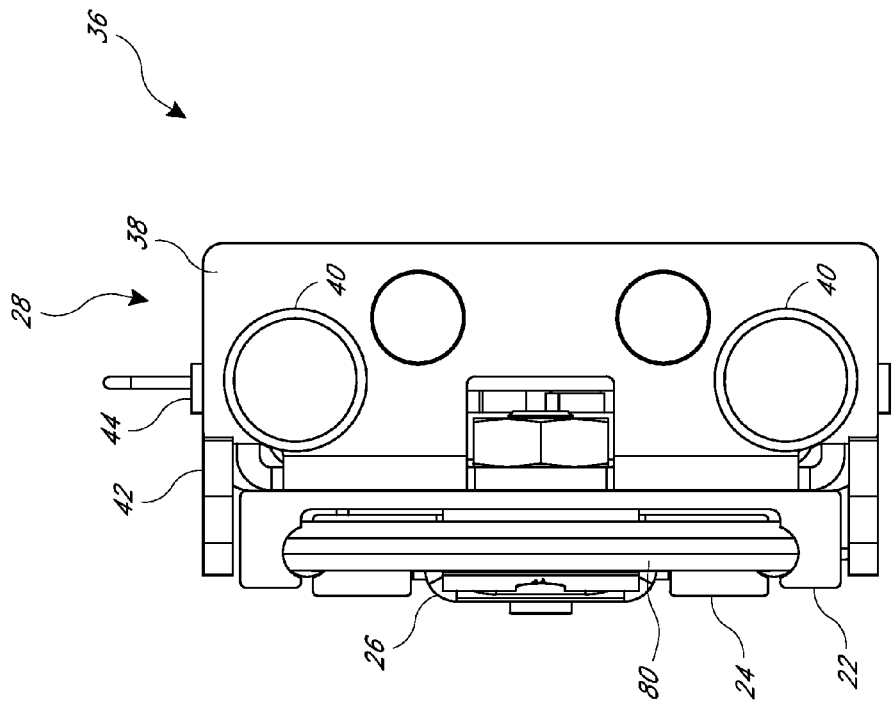
FIG. 1 is a front view of a first slide assembly.
Figure 2:
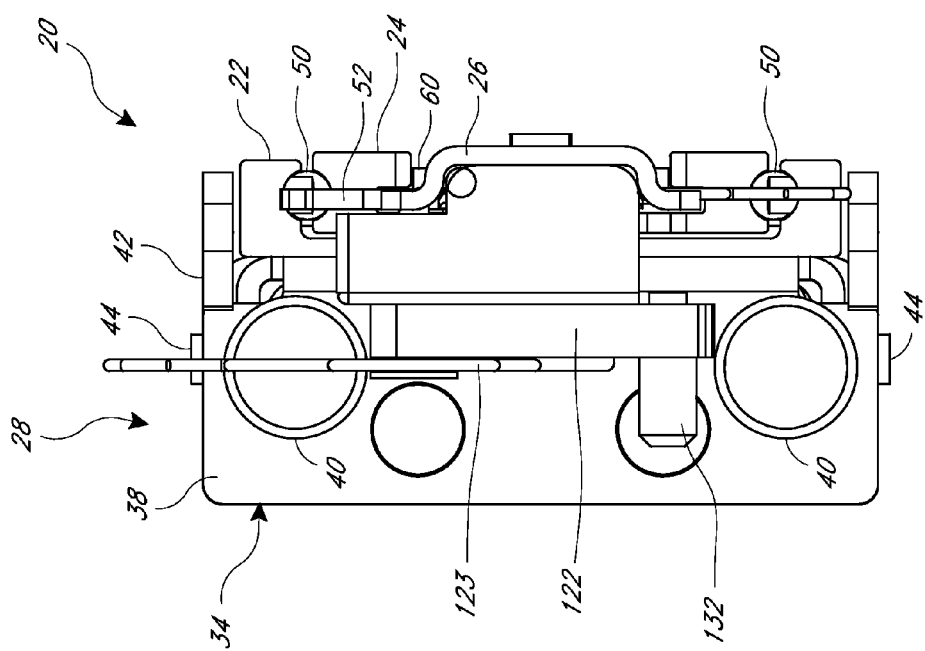
FIG. 2 is a rear view of the slide assembly of FIG. 1.

Preferred embodiments of the compact slide assemblies include between two and four (or possibly more) slide segments telescopically engaged with one another to move between a closed position and an open position. The slide segments may also be referred to as channels herein. However, the use of the term "channel" does not imply any particular cross-sectional shape. The segments or channels may be any suitable shape to permit telescopic engagement between the segments. Certain preferred cross-sectional shapes are illustrated and/or described herein. Typically, one or more slide assemblies permit one object to be supported and moved relative to another object. One object is often stationary, such as an enclosure or rack, and the other object, such as a drawer or a computer server, is movable between an open and closed position relative to the stationary object. Often, a slide assembly is provided on each side of the supported object. For convenience, the slide assembly is referred to as having an outboard side and an inboard side. The outboard side typically faces outwardly from the supported object and the inboard side faces toward the supported object. Also, the slide assembly is referred to as having a forward end and a rearward end. The slide assembly opens from the forward end and moves away from the rearward end. These, and other relative terms (top, bottom, above, below, etc.) are used for convenience and with respect to the particular orientation shown in the referenced figures and are not intended to be limiting. Thus, the slide assemblies can also be used in other orientations, or adapted for use in orientations other than those illustrated.

The preferred embodiments disclosed herein are well-suited for use in movably supporting computer servers relative to a server rack. In particular, the preferred slide assemblies have a relatively small cross-sectional size such that the space available for the computer server can be maximized. In addition, the slide assemblies are capable of supporting the load applied by the servers, and often additional loading, while still maintaining smooth extension and retraction of the slide assembly. Furthermore, preferably, the slide assemblies can be manufactured in a cost-effective manner. Thus, certain preferred embodiments include one or more slide segments extruded from an aluminum material, preferably 6061 aluminum, in an extrusion process that forms the slide segment with accurate, final cross-sectional dimensions such that no secondary machining or processing of the engagement or bearing surfaces is necessary. Rather, the work piece is extruded, cut to length, any transverse openings or cut-outs are created and then the segment is ready for pre-final or final assembly. As discussed below, in some arrangements, the slide assembly is a hybrid including one or more aluminum segments and one or more steel segments.

FIGS. 1-13 illustrate a compact slide assembly 20 having certain features, aspects and advantages of the preferred embodiments. In the illustrated arrangement, the slide assembly 20 includes three slide segments: an outer slide segment 22, an intermediate slide segment 24 and an inner slide segment 26 telescopically engaged with one another and movable between a closed position and an open position. However, in other arrangements, the slide assembly 20 may include only two segments, or more than three segments. As described in greater detail hereinafter, the slide assembly 20 preferably includes one or more locking mechanisms that permit the slide assembly 20 to be selectively locked in one or more of a closed position, an open position, and a partially open or closed position, among others. In addition, the slide assembly 20 may include bearings or rollers interposed between the slide segments 22, 24, 26 to facilitate smooth relative movement therebetween.

Figure 12:
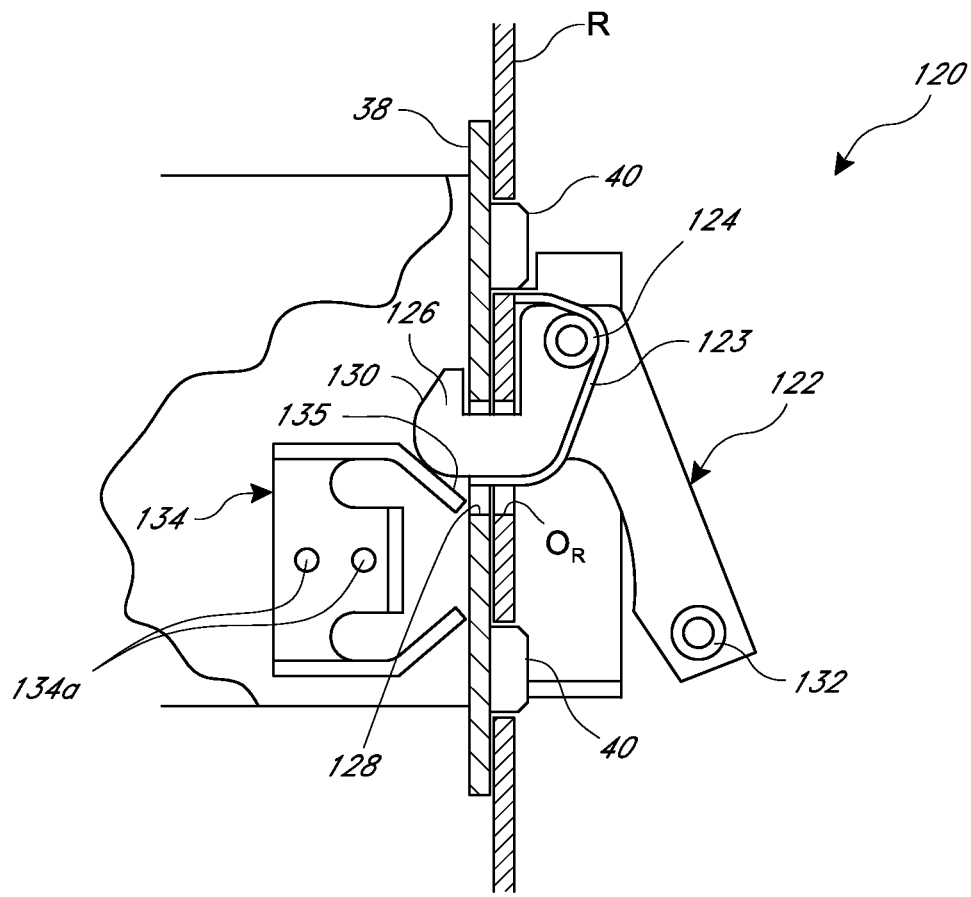
FIG. 12 is a cross-sectional view of a lock assembly that locks the slide assembly in a closed position and cooperates with the rack on which the slide assembly is mounted.

The slide assembly 20 is configured to be secured to a stationary object, which can be a computer server rack, for example. Typically, the computer server rack includes vertical mounting rails at each corner. The slide assembly 20 includes a mounting arrangement 28 (FIG. 3) that permits the slide assembly 20 to be secured to the mounting rails R of a server rack (FIG. 12). The illustrated mounting arrangement 28 permits tool-less attachment of the slide assembly 20 to the mounting rails of the computer server rack. Preferably, the mounting arrangement 28 is attached to the outer slide segment 22 such that the outer slide segment 22 is connected to the server rack and the inner slide segment 26 carries the computer server. However, in other arrangements, the inner segment may be connected to the stationary object and the outer slide segment may be connected to the movable object. Moreover, the slide assembly 20 may be connected to the server rack in any suitable manner, including tool-less attachment or attachments utilizing fasteners that require tools to assemble or disassemble.

Figure 3:
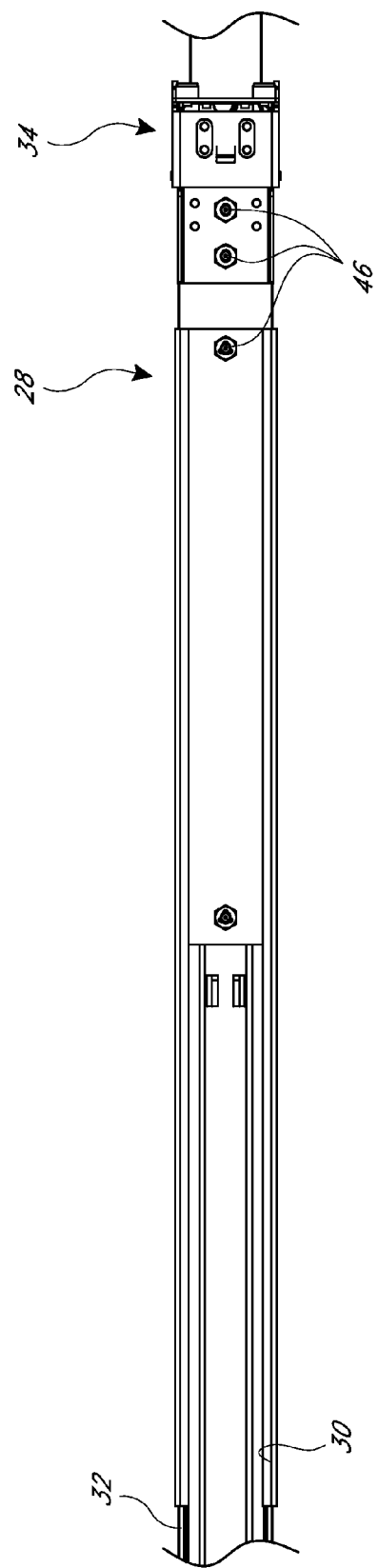
FIG. 3 is a side view of a first or outboard side of a rearward portion of the slide assembly of FIG. 1 in an open position.
Figure 7:
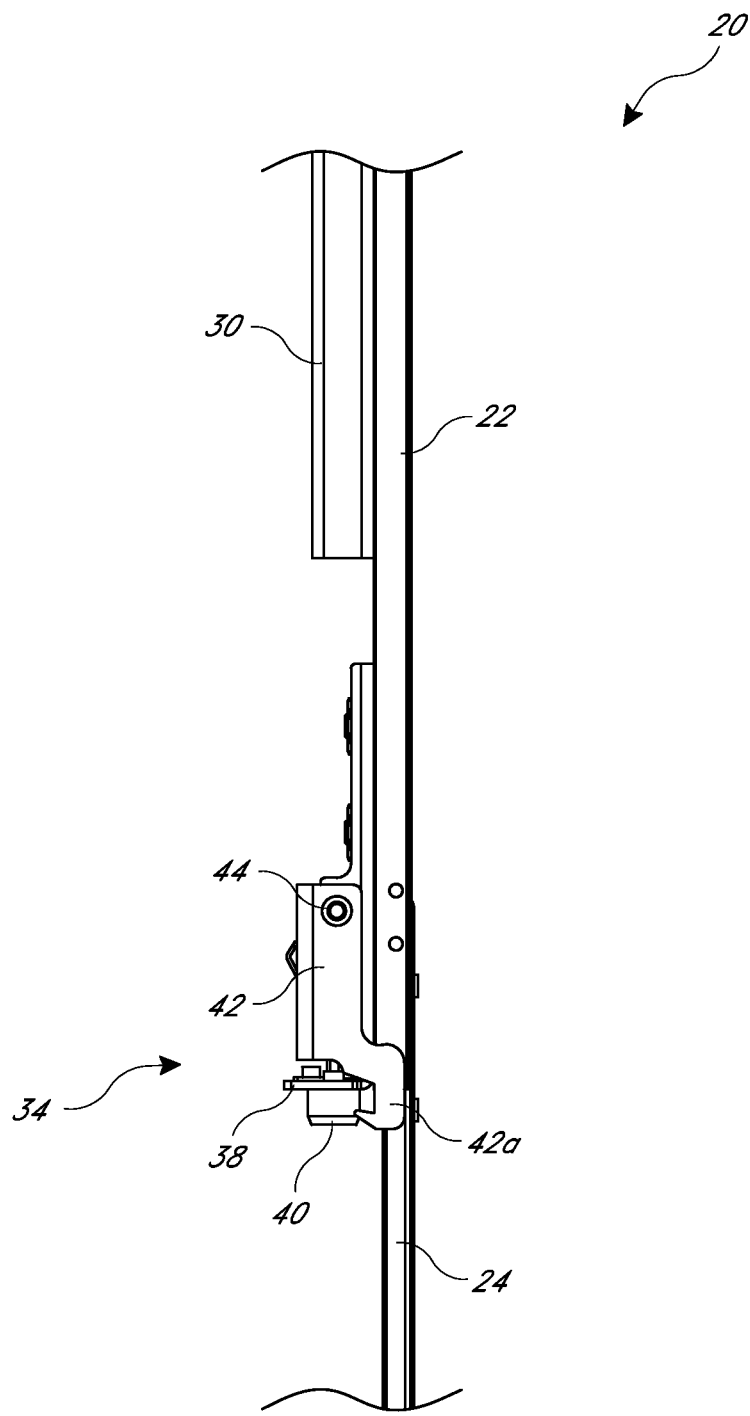
FIG. 7 is a top view of an intermediate portion of the slide assembly of FIG. 1.
Figure 8:
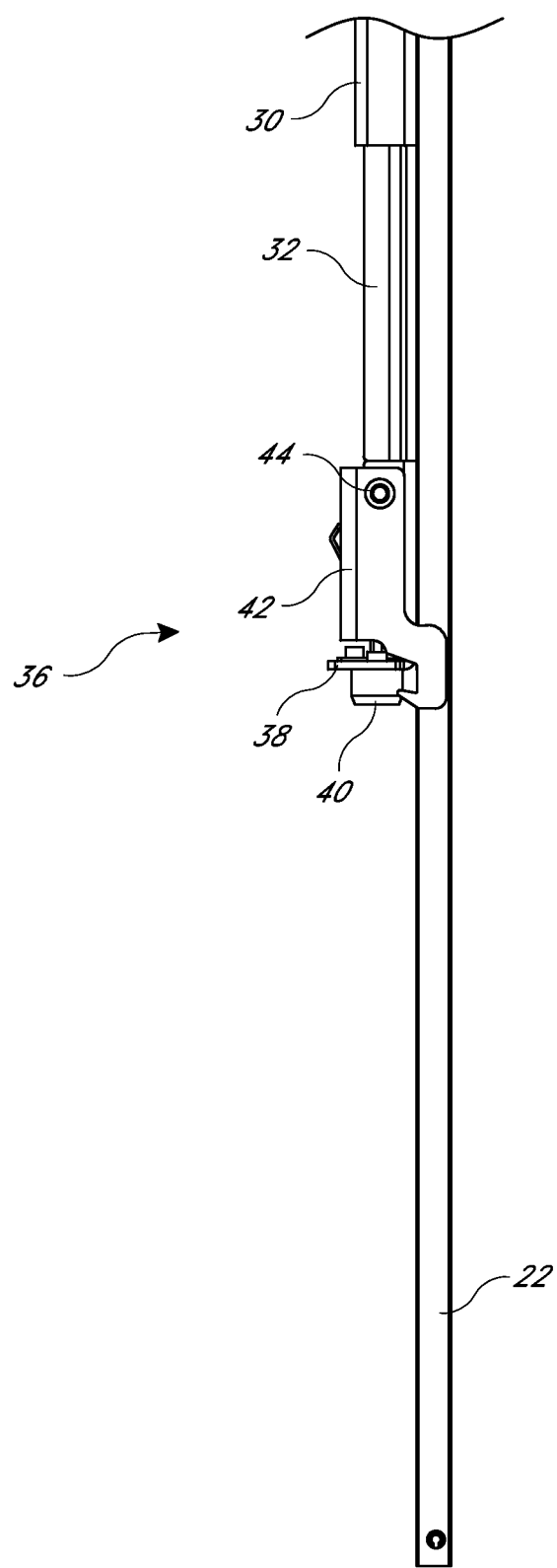
FIG. 8 is a top view of a rearward portion of the slide assembly of FIG. 1.
Figure 9:
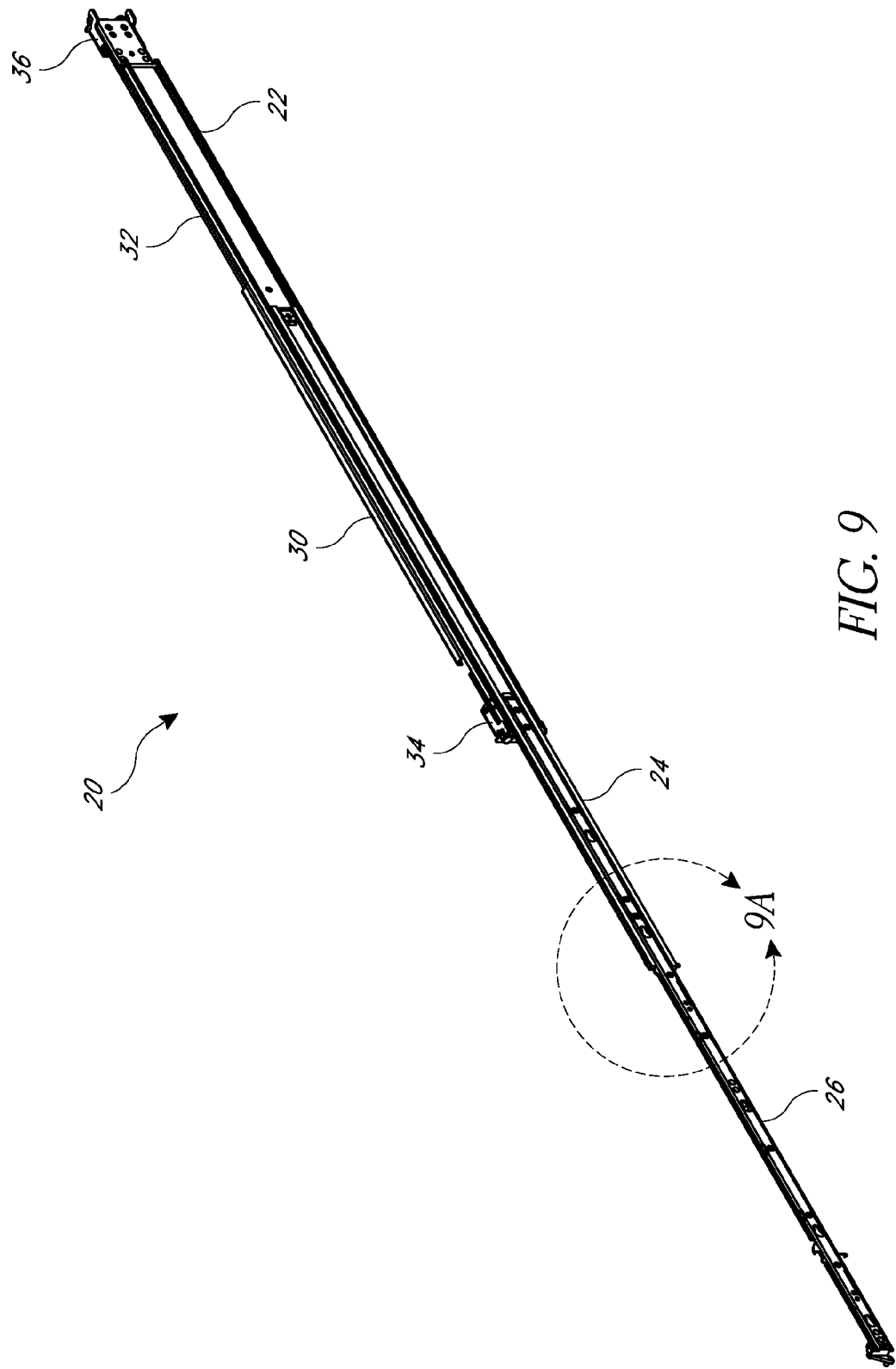
FIG. 9 is a perspective view of the slide assembly of FIG. 1.
Figure 9A:
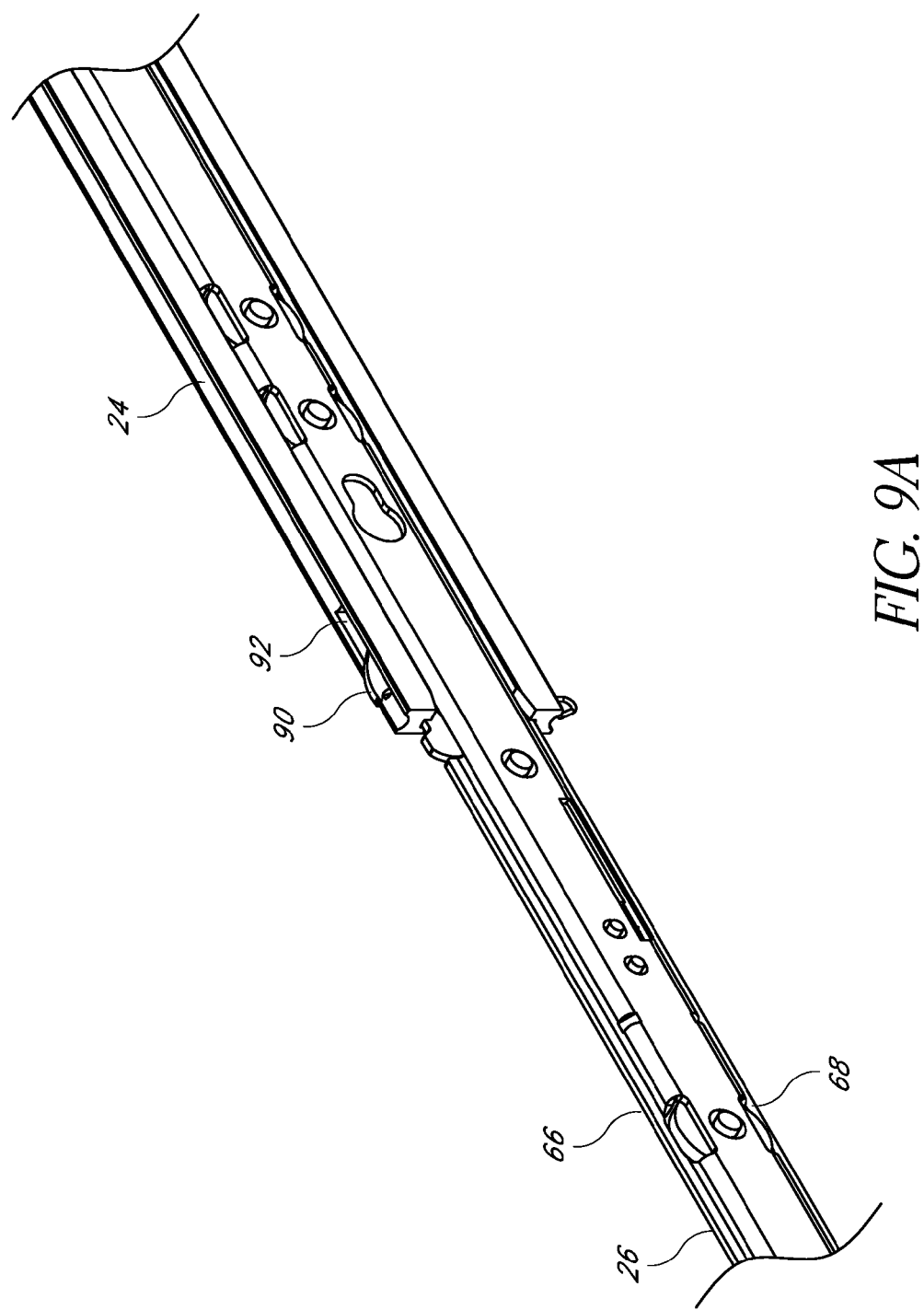
FIG. 9A is an enlarged view of a portion of the slide assembly shown in FIG. 9.
Figure 11:
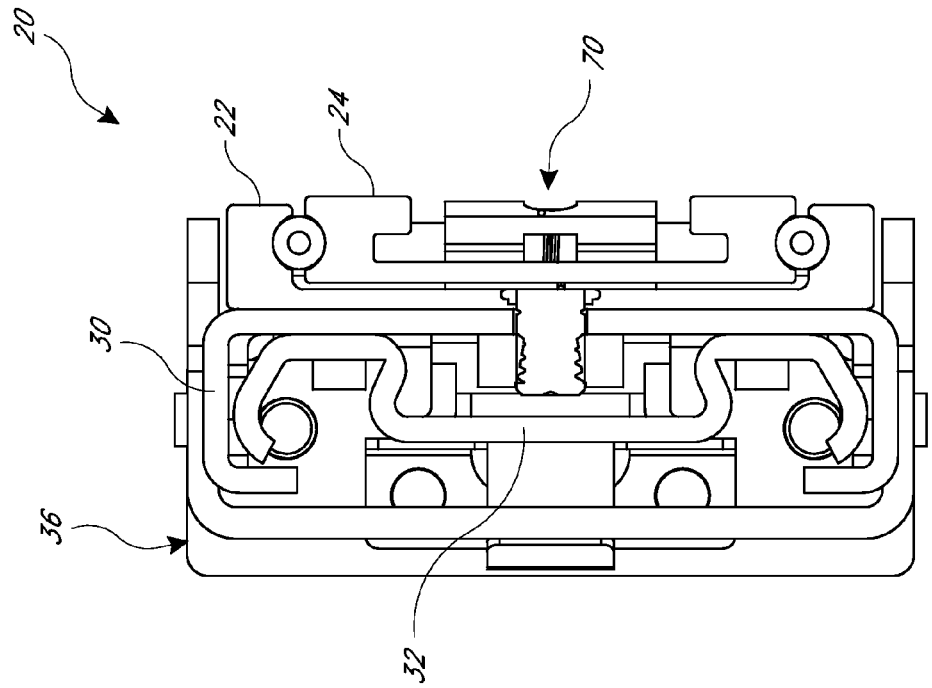
FIG. 11 is a cross-sectional view of the slide assembly of FIG. 1 taken along the line 11-11 of FIG. 5.
Figure 10:
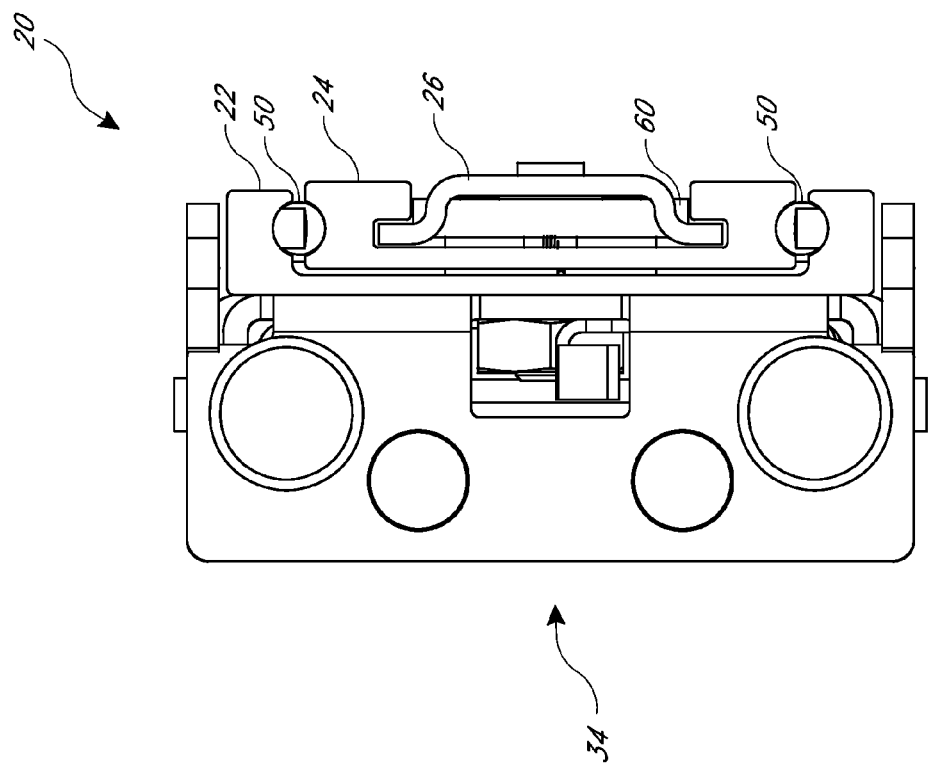
FIG. 10 is a cross-sectional view of the slide assembly of FIG. 1 taken along the line 10-10 of FIG. 5.

With particular reference to FIGS. 3, 7 and 8, the illustrated tool-less mounting arrangement 28 not only permits the slide assembly 20 to be coupled to the server rack, but also provides a substantial amount of length adjustment such that the mounting arrangement 28 can accommodate server racks that vary widely in depth. In particular, the mounting arrangement 28 includes a first channel 30 and a second channel 32 telescopically engaged with one another such that the overall length defined by the first channel 30 and second channel 32 can be adjusted. One of the channels 30, 32 is connected to the outer slide segment 22 and the other channel 30, 32 is movable relative to the outer slide segment 22. In the illustrated arrangement, the first channel 30 is secured to the outer slide segment 22 and is positioned forward of the second channel 32. The second channel 32 is adjustable relative to the first channel 30 and the outer slide segment 22. However, in other embodiments, this arrangement could be reversed.

The mounting arrangement 28 includes a first coupling or bracket 34 (FIG. 7) at a first or forward end and a second coupling or bracket 36 (FIG. 8) at a second or rearward end. The brackets 34, 36 permit tool-less connection of the mounting arrangement 28 to the server rack. Each of the illustrated brackets 34, 36 include a bracket body 38 with one or more projecting pins 40. Preferably, two pins are provided on the forward bracket 34 and three pins 40 are provided on the rearward bracket 36; however, other numbers of pins 40 are also possible. The pins 40 are configured to engage mounting holes in the vertical rails of the computer server rack. The illustrated pins 40 are generally cylindrical in shape. However, other suitable shapes may also be used. The pin 40 shape may be configured to match the shape of the server rack mounting holes or may simply be configured to be capable of engagement with the mounting holes (e.g., circular pin in a rectangular hole). Each of the brackets 34, 36 also include a latch 42 that secures the bracket 34, 36 to the server rack. The latch 42 is pivotally coupled to the bracket body 38 to rotate about a pivot axis 44. As described in greater detail hereinafter, the latch 42 pivots out of the way upon contact with the server rack to permit the pins 40 to engage the mounting holes of the server rack. Once the pins 40 are engaged, the latch 42 pivots (under the urging of a biasing member) such that a hook portion 42a engages the server rack and secures the bracket 34, 36 in place.

The mounting arrangement 28 may be secured to the slide outer slide segment 22 (or other portion of the slide assembly 20) by any suitable arrangement. In the illustrated arrangement, the mounting arrangement 28 is secured to the outer slide segment 22 by a plurality of fasteners 46, such as press pins. However, other suitable fasteners, such as bolt-and-nut assemblies or rivets, or other suitable fastening arrangements, such as welding, may be used to secure the mounting arrangement 28 to the outer slide segment 22. In particular, the first channel 30 of the mounting arrangement 28 is secured to the outer slide segment 22 by the fasteners 46 and the second channel 32 is movable relative to the first channel 30 such that the distance between the brackets 34, 36 can be adjusted to match the distance between the forward and rearward vertical mounting rails of the computer server rack.

Preferably, the intermediate slide segment 24 is supported for movement relative to the outer slide segment 22 by a plurality of bearings and, in particular, ball bearings 50. In the illustrated arrangement, the ball bearings 50 are loosely carried between the bearing surfaces of the outer slide segment 22 and intermediate slide segment 24. A forward stop 52 (FIG. 1) and a rearward stop 54 (FIG. 6) inhibit the ball bearings 50 from exiting the space between the bearing surfaces of the segments 22, 24. In the illustrated arrangement, the stops 52, 54 are pins. The rearward stop 54 is integrated with a lock that secures the intermediate slide segment 24 in an open position relative to the outer slide segment 22. However, in other preferred embodiments, the stops 52, 54 are integrated with the segments 22, 24, such as integrated tabs punched from the body of the segment 22 or 24 and deformed into the path of the ball bearings 50.

Preferably, the inner slide segment 26 is supported for movement relative to the intermediate slide segment 24 by a plurality of rollers 60. Each of the rollers 60 includes an axle 62 that is fixedly supported within an opening in a web portion of the inner slide segment 26. A roller portion 64 is rotatably supported on the axle 62. Upper and lower portions of each roller portion 64 extend through respective upper and lower windows 66, 68 in the upper and lower flange portions of the inner slide segment 26 such that the roller portion 64 can contact bearing surfaces of the intermediate slide segment 24. Preferably, at least the roller portions 64 are constructed of a nylon material for low rolling resistance and durability. Although loose ball bearings 50 and rollers 60 are illustrated, other suitable mechanisms may be used to allow smooth movement between the individual segments 22, 24, 26, including solid bearing surfaces.

The slide assembly 20 may include multiple locks, which operate to secure segments in desirable positions relative to one another and release the segments at a desirable time during cycling of the slide assembly 20. With reference to FIG. 6, a first lock arrangement 70 secures the intermediate segment 24 in an open position relative to the outer segment 22. The first lock 70 includes a latch 72 that is rotatably supported by a vertical shaft or pin 74. The latch 72 is biased toward the outer slide segment 22 by a biasing member, such as a spring 76. A portion of the latch 72 engages an opening 78 in the outer slide segment 22 when the intermediate slide segment 24 reaches an open position relative to the outer slide segment 22 to secure the intermediate slide segment 24 in the open position. The latch 72 is released by the inner slide segment 26, which contacts the latch 72 when sufficiently closed relative to the intermediate slide segment 24 and rotates the latch 72 out of engagement with the opening 78. The intermediate slide segment 24 is then able to close relative to the outer slide segment 22. Rearward travel of the intermediate slide segment 24 within the outer slide segment 22 is limited by a stop, such as pin 80 (FIG. 5).

Figure 4:
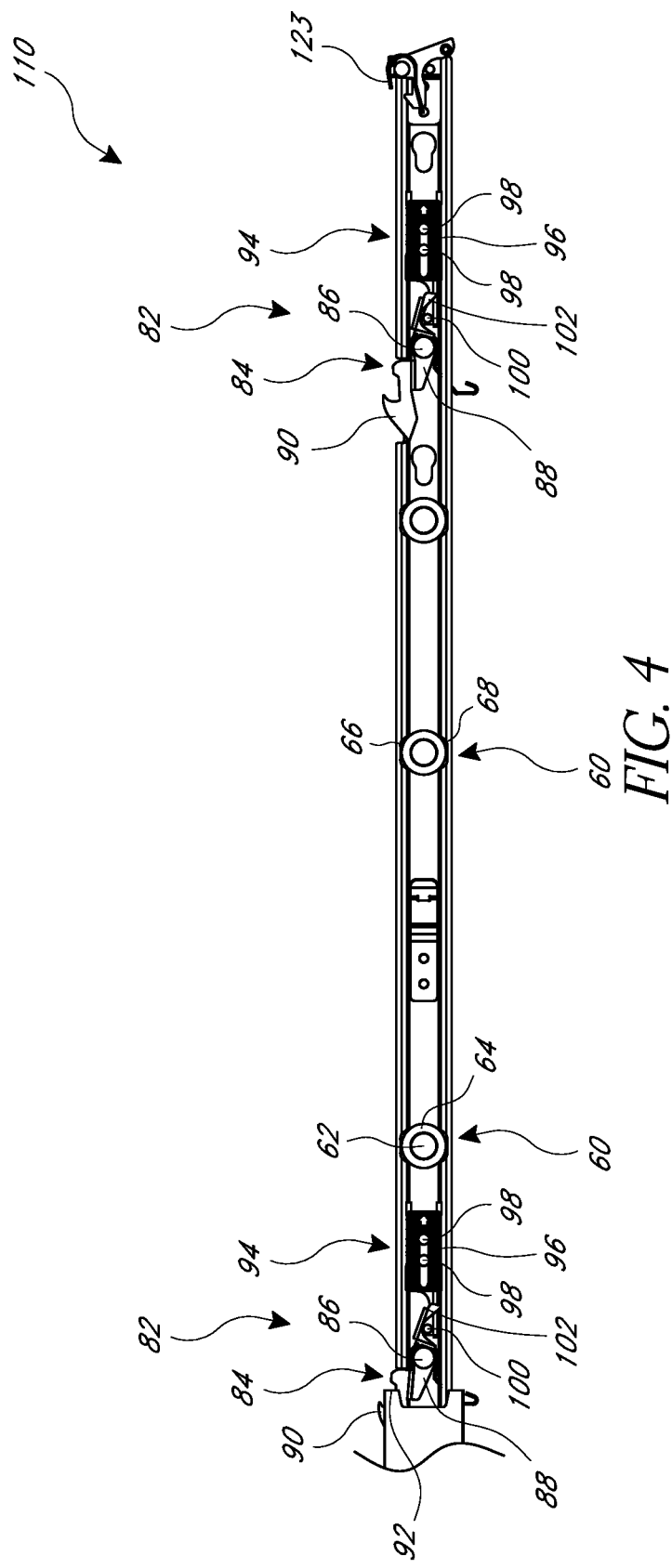
FIG. 4 is a side view of the outboard side of a forward portion of the slide assembly of FIG. 1 in an open position.

With reference to FIG. 4, the slide assembly 20 also includes a second lock arrangement 82 that operates to selectively secure the inner slide segment 26 in an open position relative to the intermediate slide segment 24 and prevents movement in at least one direction from the open position. In the illustrated arrangement, the second lock 82 inhibits movement in both directions from the open position. In other words, the second lock 82 prevents removal of the inner slide segment 26 from the intermediate slide segment 24. In addition, closing of the inner slide segment 26 is prevented until the second lock 82 is released. The second lock 82 preferably includes a latch 84 that is pivotally secured to the inner slide segment 26. A support shaft or pin 86 is fixedly secured to the inner slide segment 26 and rotatably supports the latch 84, which is biased to rotate about the pin 86 by a biasing member, such as a spring 88. The spring 88 biases a hook portion 90 of the latch 84 into engagement with an opening 92 in the intermediate slide segment 24 and, preferably, into engagement with an end surface of the intermediate slide segment 24 such that the inner slide segment 26 is secured, or locked, into an open position and prevented from removal or closing until the latch 84 is released.

The second lock 82 preferably includes a release mechanism 94 that operates to release the latch 84 from the opening 92 to permit the inner slide segment 26 to be retracted. The illustrated release mechanism 94 is manually actuated near the location of the latch 84; however, other embodiments are possible in which the release mechanism is remote from the latch 84 or is automatically actuated. The illustrated release mechanism 94 includes a release body 96 slidably supported relative to the inner slide segment 26 by a support structure, such as a pair of pins 98. The support pins 98 are fixedly secured to the inner slide segment 26 and allow the release body 96 to slide relative to the inner slide segment 26, but inhibit rotational movement of the release body 96. The release body 96 includes an actuation member, such as an actuation pin 100, that engages a corresponding ramped surface 102 of the latch 84. Upon movement of the release body 96 away from the latch 84, the actuation pin 100 interacts with the ramped surface 102 to rotate the latch 84 against the biasing force of the spring 88 until the hook 90 is released from the opening 92, thereby permitting the inner slide segment 26 to be retracted.

The illustrated slide assembly 20 also includes a third lock arrangement 110 that is operable to selectively secure the inner slide segment 26 in an intermediate position, between an open position and a closed position, relative to the intermediate slide segment 24. In the illustrated arrangement, the third lock 110 secures the inner slide segment 26 in a partially or slightly open position; however, the third lock 110 (or an additional lock) could be configured to secure the inner slide segment 26 in any desirable position relative to the intermediate slide segment 24. Preferably, the third lock 110 is substantially the same as or identical to the second lock 94 from a structural and functional standpoint and interacts with the opening 92 of the intermediate slide segment 24. Accordingly, a detailed discussion of the structure and operation of the third lock 110 is omitted.

With primary reference to FIGS. 4 and 12, preferably, the slide assembly 20 also includes a fourth lock arrangement or a "lock closed" arrangement 120. The fourth lock 120 is configured to selectively secure the slide assembly 20 in a closed position, in which the intermediate slide segment 24 is retracted relative to the outer slide segment 22, and the inner slide segment 26 is retracted relative to the intermediate slide segment 24. The illustrated fourth lock 120 includes a lock arm 122 that is rotatable relative to the inner slide segment 26 about a laterally-extending axis (an axis that extends in an outboard-inboard direction). Preferably, the lock arm 122 is biased toward a locked position by a biasing element, such as a spring 123. However, in other arrangements, the lock arm can be constructed from a resilient material such that it can be deflected and will return to its "normal" position. The lock arm 122 is rotatably supported relative to the inner slide segment 26 by a suitable arrangement or fastener, such as a pin or rivet 124.

The lock arm 122 is laterally offset from the inner slide segment 26 in an outboard direction and includes a latch portion 126 that engages an opening 128 in the forward bracket body 38. In the illustrated arrangement, the latch portion 126 is substantially hook-shaped. Preferably, the latch portion 126 is integrally-formed from material of the lock arm 122. That is, the latch portion 126 and the lock arm 122 are constructed from a single piece of material.

The lock arm 122 is configured to automatically actuate when the slide assembly 20 is closed. In particular, the latch portion 126 preferably is shaped to have a ramped surface 130 on a rearward side so that the lock arm 122 is rotated (in a counter-clockwise direction in FIG. 12) when the latch portion 126 contacts the rail R of the server rack. Accordingly, the latch portion 126 is able to pass through an opening $O_R$ of the rail R and the opening 128 of a lateral flange of the bracket body 38. In the illustrated arrangement, the opening $O_R$ is between openings $O_R$ that are engaged by upper and lower mounting pins 40. Once the latch portion 126 passes through the opening 128, the lock arm 122 rotates (in a clock-wise direction in FIG. 12) in response to a biasing force of the spring 123 such that the latch portion 126 engages a surface of the lateral flange of the bracket body 38 to secure the slide assembly 20 in the closed position.

The lock arm 122 can be selectively released when it is desired to open the slide assembly 20. Preferably, the lock arm 122 is rotated against the biasing force of the spring 123 to disengage the latch portion 126 from the opening 128. A release member is provided to allow manual rotation of the lock arm 122. Preferably, the release member has a finger grip portion. In the illustrated arrangement, the release member is a pin 132 that extends in an outboard direction from the main body of the lock arm 122.

A retention member 134 can be provided to assist in maintaining the lock arm 122 in the locked position to inhibit undesired opening of the lock arm 122, such as in response to shocks, vibration or movement of the server rack. The retention member 134 can have a ramped surface 135 that urges the lock arm 122 toward a locked position (in a clock-wise direction in FIG. 12). The ramped surface 135 can be defined by a spring arm that biases the lock arm 122 toward the locked position. Or, the spring arm can have other surface shapes (e.g., non-ramped) and primarily or completely use spring force to urge the lock arm 122 toward the locked position. The retention member 134 can be secured to the bracket body 38 (or other portion of the slide assembly 20) by any suitable arrangement, such as one or more fasteners (e.g., rivets 134a).

In a computer server application, the servers held by the slide assembly 20 can be quite valuable. Accordingly, in such applications, it can be important to inhibit undesired opening of the slide assembly 20 to avoid damage to the servers. The illustrated lock closed arrangement 120 performs well in tests intended to simulate normal or above-normal shock, vibration and movement forces that can be expected to be applied to the server rack during use. One advantage of the illustrated lock closed arrangement 120 is that the lock arm 122 passes through the opening $O_R$ of the rail R of the server rack and then, preferably, engages a part of the slide assembly 20 (e.g., the bracket body 38 in the illustrated arrangement). This results in a very strong and secure lock arrangement. Moreover, the lock closed arrangement 120 is located primarily or completely within a space or plane that extends between the rails R of the server rack and forward of the rails R of the server rack. Thus, a strong and secure lock arrangement can be provided without occupying space that can be used for other structural components or portions of the slide assembly 20 and without be limited by the cross-sectional size of the primary portion (the segments 22, 24, 26) of the slide assembly 20.

Although four lock arrangements are disclosed herein and referred to as first, second, third and fourth locks, it is not required nor implied that all four lock arrangements are necessarily present in any particular embodiment. Rather, some or all of the lock arrangements may be used depending on the particular application and the desired operational sequence of the slide assembly. Moreover, additional lock arrangements may also be provided.

Preferably, the inner slide segment 26 is configured to support an object. As described above, in one arrangement, the slide segment 26 is configured to support a computer server. In the illustrated arrangement, the inner slide segment 26 includes a plurality of keyholes 136, which receive rivets or pins 140 (FIG. 13) provided on the computer server (not shown). The pins 140 include a head portion 142 and a smaller shaft portion 144. The large opening of the keyhole 136 is configured to allow the head portion 142 of the pin 140 to pass and the slot of the keyhole 136 receives the shaft portion 144 of the pin 140. Preferably, multiple (e.g., two, three, four, five or more) keyholes 136 are provided. Desirably, at least as many keyholes 136 are provided as pins 140 present on the object with which the slide assembly 20 is intended for use.

Figure 13:
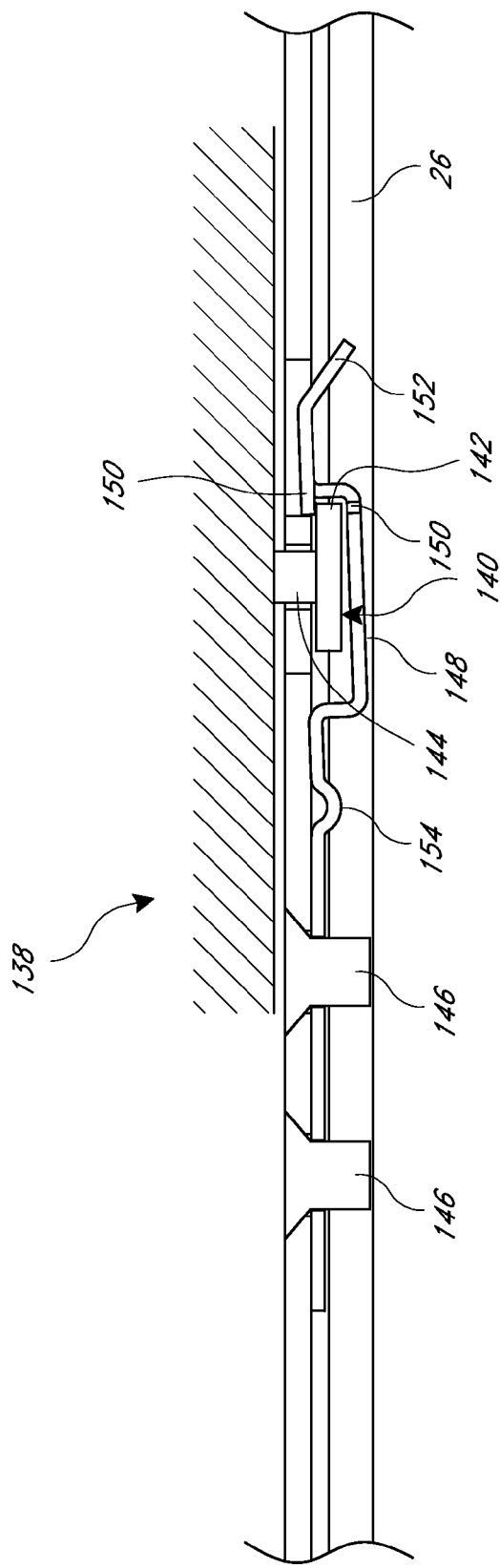
FIG. 13 is a cross-sectional view of a retention assembly that secures a mounting pin within a keyhole of the slide assembly.
Figure 14:
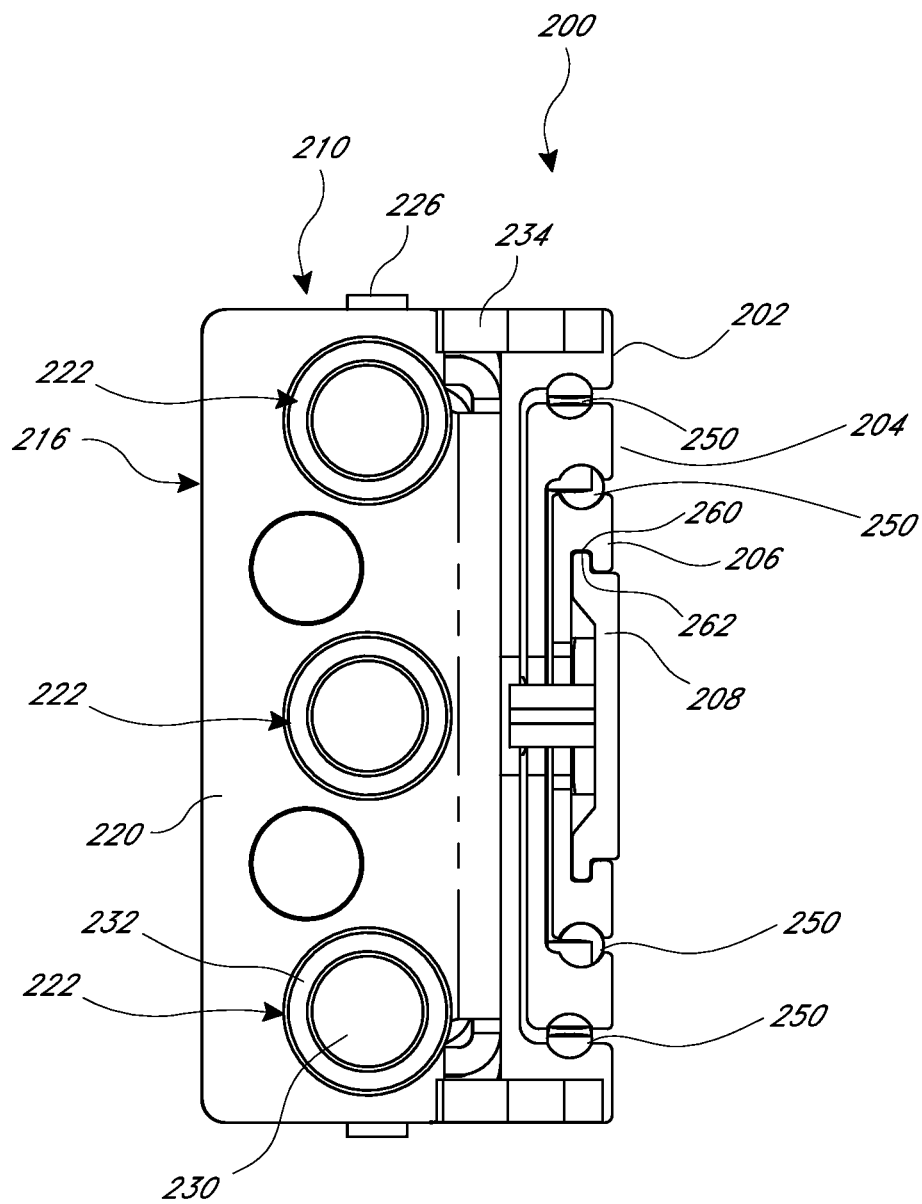
FIG. 14 is a front view of a second slide assembly having certain features, aspects and advantages of the present invention.
Figure 15:
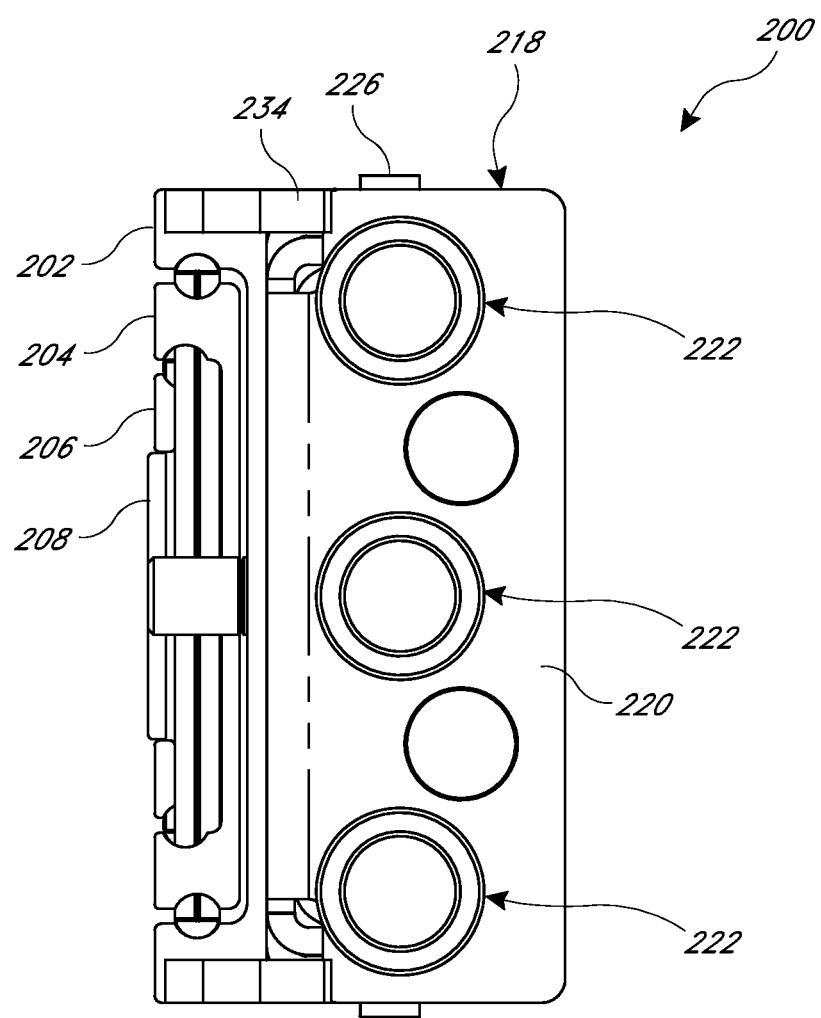
FIG. 15 is a rear view of the slide assembly of FIG. 14.
Figure 18:
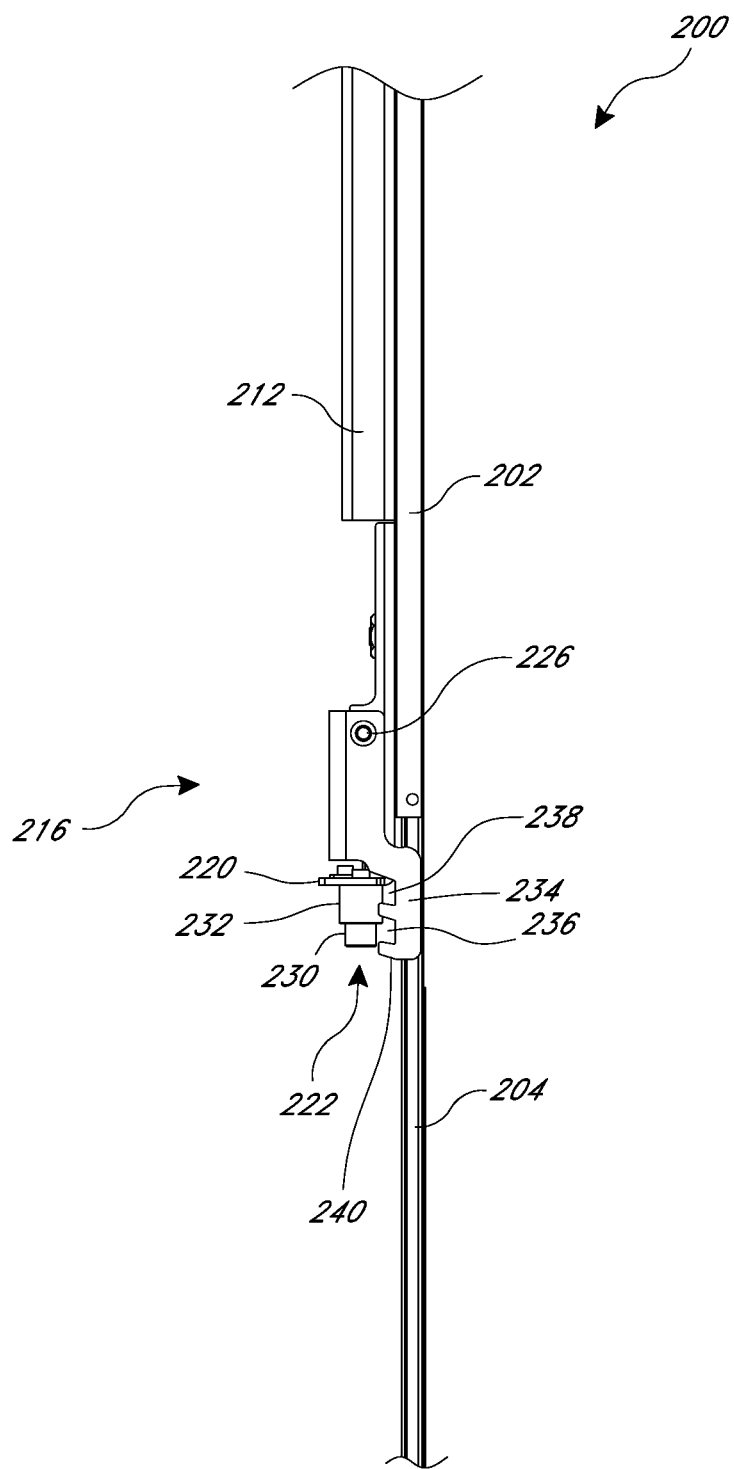
FIG. 18 is a top view of an intermediate portion of the slide assembly of FIG. 14.
Figure 19:
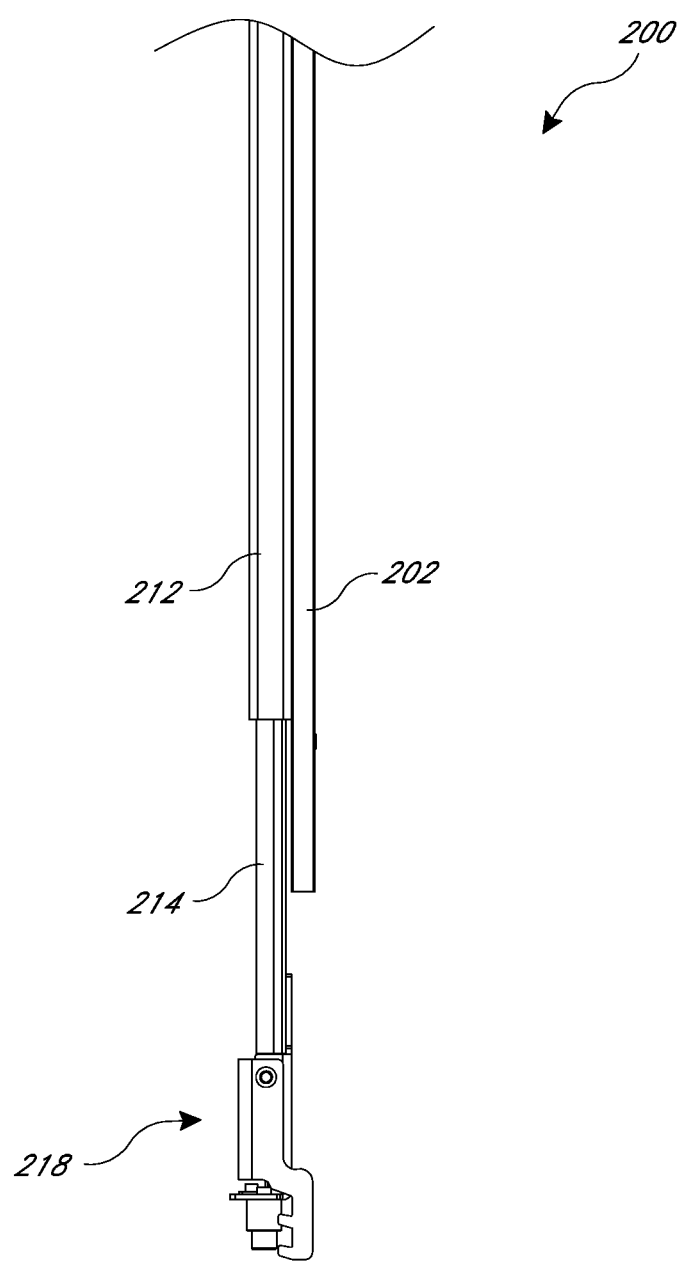
FIG. 19 is a top view of a rear portion of the slide assembly of FIG. 14.
Figure 20:
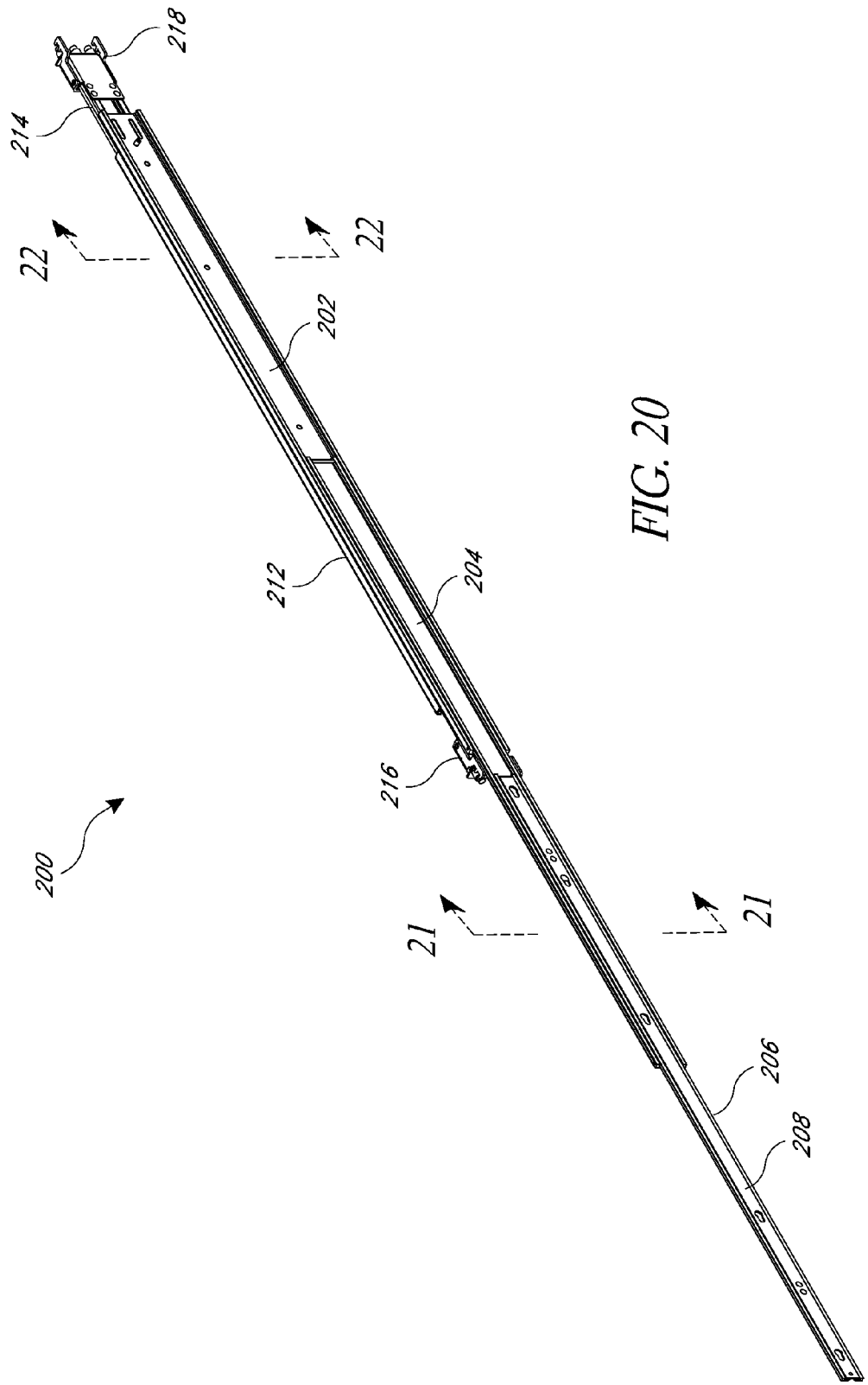
FIG. 20 is a perspective view of the slide assembly of FIG. 14.
Figure 21:
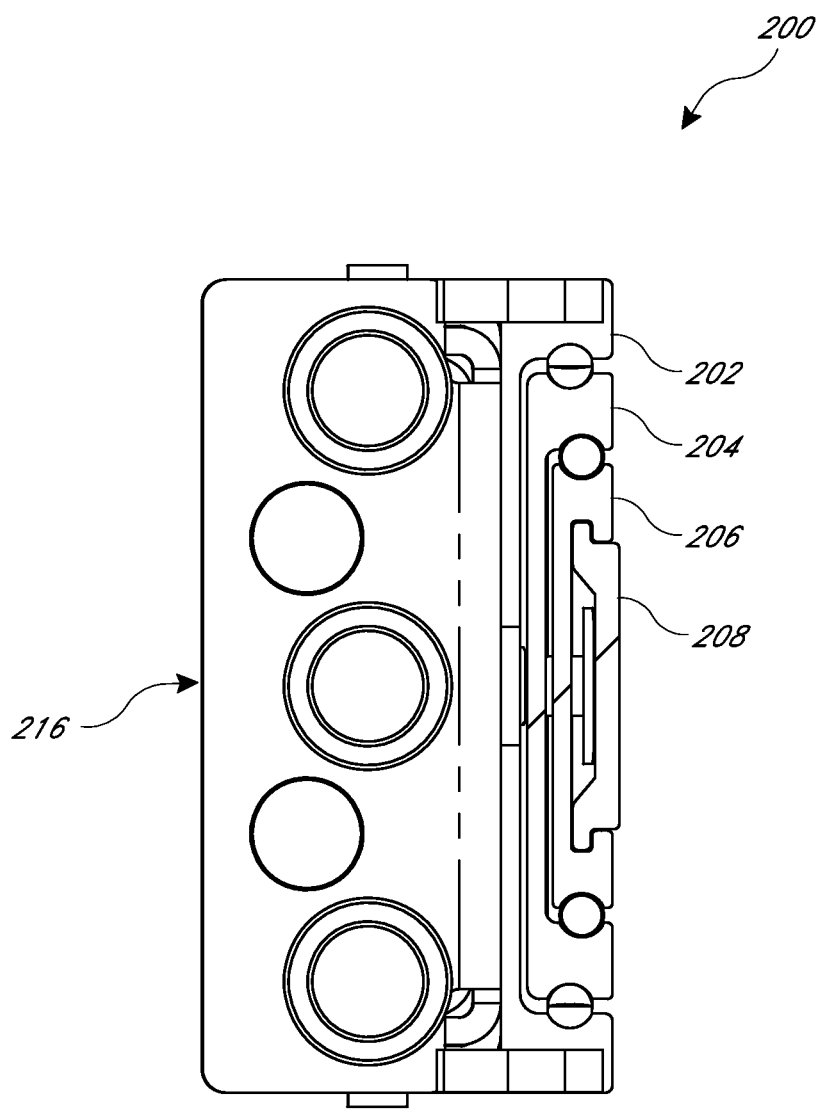
FIG. 21 is a cross-sectional view of the slide assembly of FIG. 14 taken along line 21-21 of FIG. 20.
Figure 22:
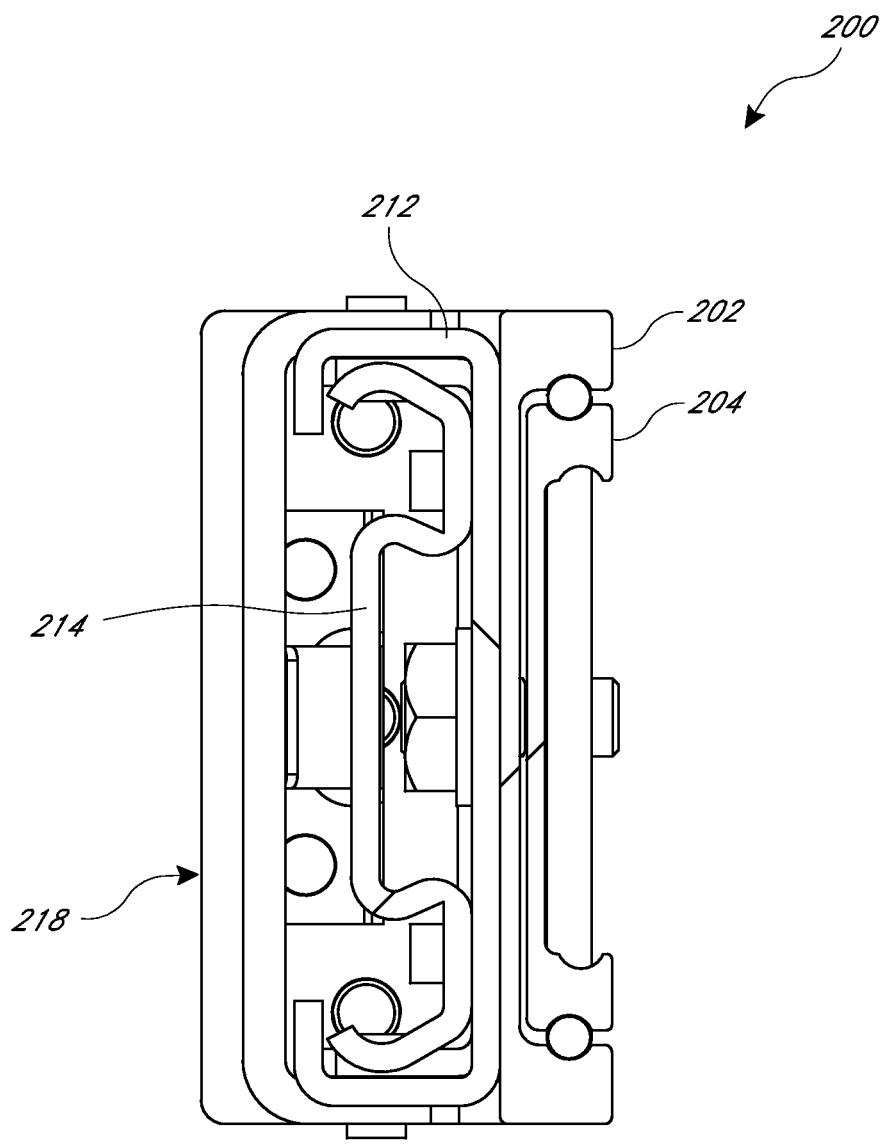
FIG. 22 is a cross-sectional view of the slide assembly of FIG. 14 taken along line 22-22 of FIG. 20.
Figure 23:
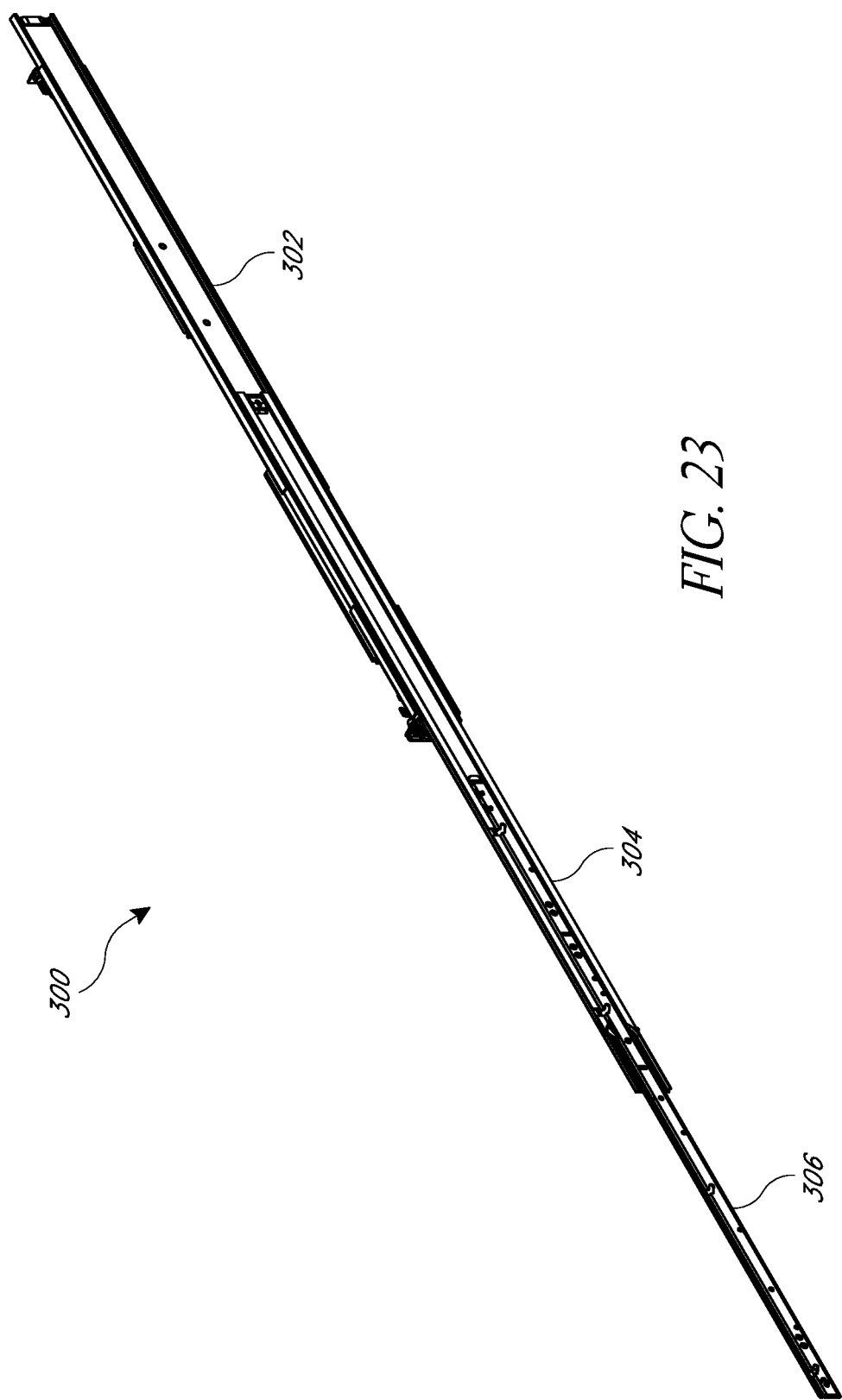
FIG. 23 is a perspective view of an inboard side of a third slide assembly.

With primary reference to FIGS. 4 and 13, a locking device, such as a spring plate 138, may be associated with one or more of the keyholes 136 to secure the pin 140 within the slot of the keyhole 136 once the pin 140 is inserted. The spring plate 138 flexes to permit the head portion 142 of the pin 140 to pass through the opening of the keyhole 136 and then returns to its original position to inhibit the shaft portion 144 of the pin 140 from exiting the slot of the keyhole 136. The spring plate 138 can be secured to the inner slide segment 26 by any suitable arrangement, such as by a plurality (e.g., two) fasteners (e.g., rivets 146 or screws). The spring plate 138 can be formed or bent to define one or more features. For example, the spring plate 138 can define a recess 148 that accommodates the head portion 142 of the pin 140. A retention tab 150 extends behind the head portion 142 of the pin 140 to retain the pin 140 within the slot of the keyhole 136. An angled tab 152 extends in an outboard direction and can provide a finger grip portion to allow the spring plate 138 to be flexed in an outboard direction to permit the pin 140 to be removed from the keyhole 136 (and, thus, the server or other object to be separated from the inner slide segment 26/slide assembly 20). A semi-cylindrical flex zone 154 can be provided to facilitate flexure of the spring plate 138 and reduce the stress at the rivets 146.

The components of the slide assembly 20 may be constructed of any suitable material and by any suitable manufacturing process. However, in a particularly preferred embodiment, the slide assembly 20 is a hybrid steel/aluminum slide assembly. In particular, the outer slide segment 22 and intermediate slide segment 24 preferably are constructed from a 6061 series aluminum material by a precision extrusion process. As a result, the cross sectional shape and dimensions can be precisely controlled such that no secondary processing (such as machining) is necessary for cross-sectional shape features such as the bearing surfaces. This is in contrast to common manufacturing methods of roll forming a steel material and then machining the bearing surfaces to the desired tolerances. However, it is noted that additional processes may be used to create lateral through-holes in the segments 22, 24, 26. Advantageously, with the preferred manufacturing method, the use of comparatively more expensive aluminum is offset by the elimination (or reduction) of secondary processing. In addition, preferably, the inner slide segment 26 is constructed from a steel material, preferably by roll forming techniques. Advantageously, the use of the rollers 60 eliminates the need for secondary processing of the inner slide segment 26 because what would otherwise be the "bearing surfaces" are not utilized for contact with bearing members or direct sliding contact with the bearing surfaces of the intermediate slide segment 24.

In operation, the slide assembly 20 is coupled to the server rack. One of the brackets 34, 36 is coupled to the respective one of the forward or rearward vertical rails R of the server rack. The channels 30, 32 are slid relative to one another to adjust the length of the mounting arrangement 28 such that the other of the brackets 34, 36 can be coupled to the other of the forward and rearward rails R of the server rack. The latches 42 engage the rails of the server rack to inhibit unintentional disconnection of the slide assembly 20. Typically, another slide assembly 20 is secured to the other side of the server rack. A computer server can be connected to the slide assembly 20 by engaging the pins of the server with the keyholes 136 of the inner slide segment 26.

From a closed position, the lock 120 can be released to permit opening (or extension) of the slide assembly 20. As the slide assembly 20 is extended, the lock 70 engages to secure the intermediate slide segment 24 in an open position relative to the outer slide segment 22. In addition, the lock 110 engages to secure the inner slide segment 26 in a partially open position. The lock 110 can be released to allow the inner slide segment 26 to move to an open position. The lock 82 then engages to secure the inner slide segment 26 in the open position. To retract the slide assembly 20, the lock 82 is released and the inner slide segment 26 is retracted. The inner slide segment 26 contacts the latch 72 to disengage the lock 70, which permits the intermediate slide segment 24 to retract relative to the outer slide segment 22. Once the slide assembly 20 reaches the closed position, the lock 120 engages to secure the slide assembly 20 in the closed position.

FIGS. 14-22 illustrate another preferred embodiment of a slide assembly 200. Slide assembly 200 is similar in certain respects to slide assembly 20. Accordingly, certain features of the slide assembly 200 are described by reference to corresponding features of the slide assembly 20. Preferably, slide assembly 200 includes four slide segments: an outer slide segment 202, a first intermediate slide segment 204, a second intermediate slide segment 206 and an inner slide segment 208. However, in some embodiments, the slide assembly 200 may include only three segments. In still other arrangements, the slide assembly 200 may include only two segments or may include more than four segments. In a preferred embodiment, at least some of the slide segments are constructed from a 6061 series aluminum material by a precision extrusion process to gain the advantages described above in connection with the slide assembly 20. However, in other arrangements, other suitable materials (including other types of aluminum, steel, plastics, etc.) and other suitable construction methods (e.g., roll forming) may be utilized.

The slide assembly 200 includes a mounting arrangement 210, which is similar to the mounting arrangement 28 of slide assembly 20. The mounting arrangement 210 includes a first channel 212 telescopically engaged with a second channel 214, and a pair of couplings or brackets 216, 218. The brackets 216, 218 preferably are tool-less brackets similar to the brackets 34, 36 of slide assembly 20. In particular, each bracket 216, 218 includes a bracket body 220 with one or more projecting pins 222. Preferably, three pins 222 are provided; however, other numbers of pins 222 are also possible. The pins 222 engage mounting holes in the vertical rails of the computer server rack. Each bracket 216, 218 also includes a latch 224 that secures the bracket 216, 218 to the server rack. The latch 224 is pivotally coupled to the bracket body 220 for rotation about a pivot axis defined by a pin 226. The latch 224 pivots out of the way upon contact with the server rack to permit the pins 222 to engage the mounting holes of the server rack. Once the pins 222 are engaged, the latch 224 pivots (under the urging of a biasing member) to engage the server rack and secure the bracket 216, 218 in place.

In particular, each of the illustrated pins 222 includes a first portion 230 having a first cross-sectional size and/or shape and a second portion 232 having a second cross-sectional size and/or shape that is different from the first portion 230. Preferably, one or the other of the first portion 230 and second portion 232 engage the mounting holes of the server rack. The latch 224 includes a hook portion 234 having a first slot 236 and a second slot 238, which correspond to the first portion 230 and second portion 232, respectively, of the pin 222. If the first portion 230 of the pin 222 is in engagement with the mounting hole of the server rack, the first slot 236 engages a portion of the mounting rail of the server rack to inhibit the removal of the pin 222 from the mounting hole and resulting disconnection of the bracket 216, 218. Similarly, if the second portion 232 of the pin 222 is engaged with the mounting hole, the second slot 238 engages a portion of the mounting rail. The rounded surface 240 on the end of the hook 234 rotates the latch 224 upon contact with the mounting rail and subsequent movement of the bracket 216, 218 toward the mounting rail such that the pins 222 are able to be engaged with the mounting holes. The biasing member causes the latch 224 to rotate once one of the slots 236, 238 is aligned with the mounting rail to lock the bracket 216, 218 in place. The latch 224 can be rotated against the force of the biasing member to release the mounting rail from the slot 236 or 238 so that the bracket 216, 218 can be removed from the mounting rail.

Preferably, bearing arrangements 250 are interposed between one or more pairs of the slide segments 202, 204, 206, 208. The bearing arrangements 250 may be loose ball bearings held in place by suitable stops, similar to those described with respect to slide assembly 20. However, other suitable arrangements may also be used, such as bearings within bearing retainers, rollers or solid bearing surfaces, for example. Preferably, bearing arrangements 250 are utilized between the outer slide segment 202 and the first intermediate slide segment 204. Preferably, bearing arrangements 250 are also utilized between the first intermediate slide segment 204 and the second intermediate slide segment 206.

Desirably, the inner slide segment 208 is supported for sliding movement relative to the second intermediate slide segment 206 by solid bearing surfaces 260 and 262. Preferably, the second intermediate slide segment 206 is generally C-shaped in cross-section. Bearing surfaces 260 are defined by the upper and lower portions of the segment 206 cross-section. The inner slide segment 208 includes flanges that define the bearing surfaces 262, which contact and slide upon the bearing surfaces 260. The C-shaped cross-section of the second intermediate slide segment 206 inhibits lateral disengagement of the inner slide segment 208 from the second intermediate slide segment 206. However, in other embodiments, other types of bearing arrangements or other suitable structures may be employed. The inner slide segment 208 may be removed from the second intermediate slide segment 206 along with the computer server supported by the slide assembly 200. As a result, reinsertion of the computer server into the server rack is easily accomplished by reinserting the inner slide segment 208 into the second intermediate slide segment 206. Thus, the inner slide segment 208 is provided primarily to facilitate removal and replacement of the computer server. However, in some arrangements, the inner slide segment 208 may be configured to permit additional slide travel over what is achieved with the outer slide segment 202, first intermediate slide segment 204 and second intermediate slide segment 206.

The slide assembly 200 may include one or more lock arrangements, which operate to secure segments 202, 204, 206, 208 of the slide assembly 200 in desirable positions relative to one another. The locks employed may be similar in structure and/or function to any of the locking arrangements described above with respect to slide assembly 20. In addition, other suitable types of locking arrangements may be used.

Preferably, the slide assembly 200 is configured to support an object, such as a computer server. The inner segment 208 of the slide assembly 200 may include a plurality of keyholes 270 which, preferably, are similar to the keyholes 136 of slide assembly 20 and may include a locking element, such as locking device 138.

Installation and operation of the slide assembly 200 preferably are similar to the installation and operation of the slide assembly 20 described above. However, the installation and operation may vary to the extent that the particular embodiment of the slide assembly 200 differs from the slide assembly 20.

FIGS. 23-31 illustrate another preferred embodiment of a slide assembly 300. Slide assembly 300 is similar in certain respects to the slide assemblies 20 and 200. Accordingly, certain features of the slide assembly 300 are described by reference to corresponding features of the other slide assemblies 20 and 200. Preferably, slide assembly 300 includes three segments: an outer slide segment 302, an intermediate slide segment 304 and an inner slide segment 306. However, in some embodiments, the slide assembly 300 may include two segments, four segments, or more than four segments. In a preferred embodiment, at least portions of the slide assembly are precision extruded of an aluminum material, as discussed in connection with the slide assemblies 20 and 200. In the illustrated arrangement, the outer and intermediate segments 302, 304 are aluminum and the inner segment 306 is made from roll-formed steel. However, in other arrangements, other suitable materials (including other types of metal, plastics, etc.) may be utilized.

The slide assembly 300 is arranged so that the slide segments 302, 304 and 306 can slide in relation to one another in a telescopic arrangement, as discussed in the previous embodiments. Preferably, the intermediate slide segment 304 is supported for movement relative to the outer slide segment 302 by a plurality of bearings and, in particular, ball bearings 350. As illustrated, the ball bearings 350 are loosely carried between the bearing surfaces of the outer slide segment 302 and intermediate slide segment 304. Preferably, forward and rearward stops inhibit the ball bearings from exiting this space, as described in the previous embodiments. Preferably, the inner slide segment 306 is supported for movement relative to the intermediate slide segment 304 by a plurality of rollers 60, as described in the previous embodiments. The slide assembly 300 preferably includes multiple locks, which operate to secure the segments 302, 304, 306 in desirable positions relative to one another, similar to those described in slide assemblies 20 and 200 above.

Figure 26:
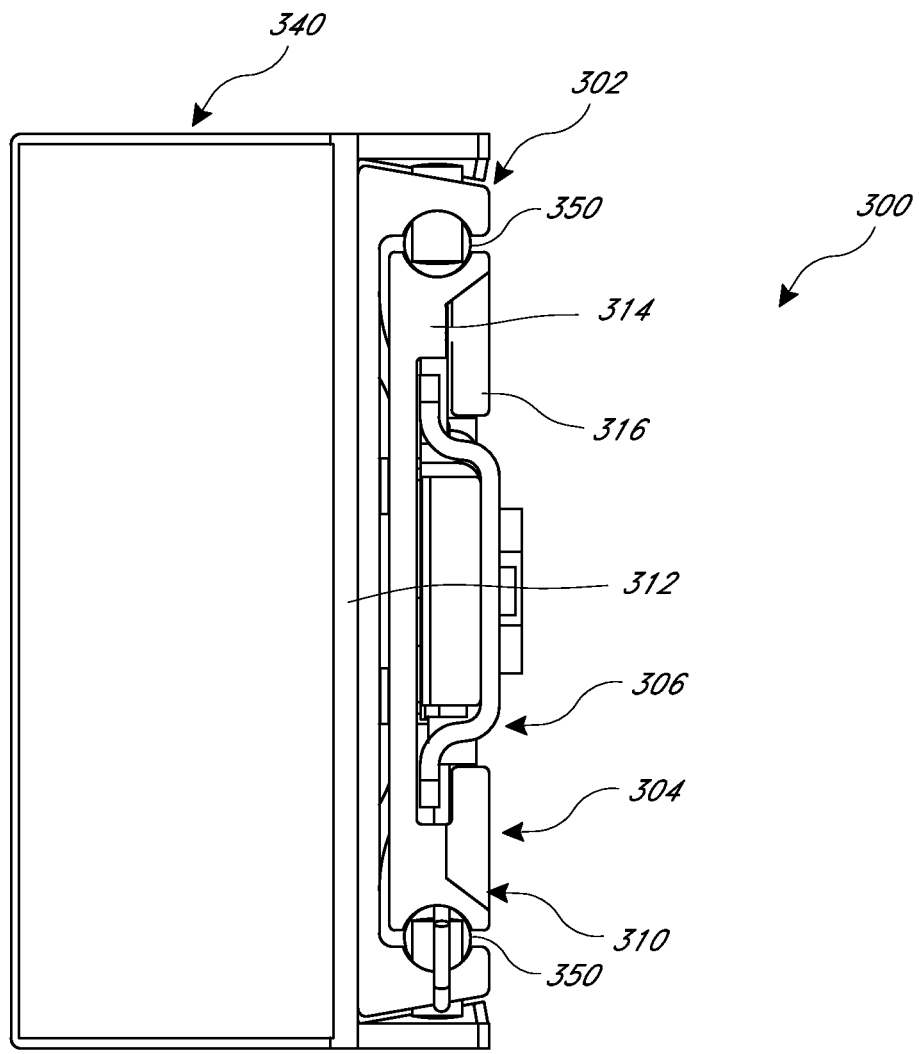
FIG. 26 is a front view of the slide assembly of FIG. 23.
Figure 27:
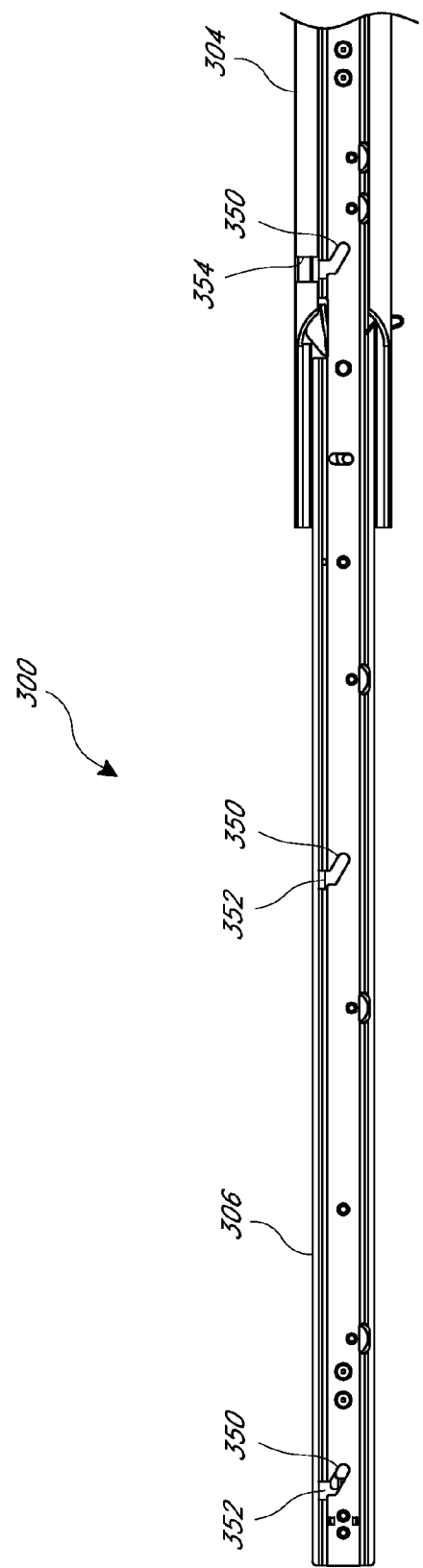
FIG. 27 is a side view of an inboard side of a forward portion of the slide assembly of FIG. 23.

With primary reference to FIG. 26, in slide assembly 300, a portion of the outer slide segment 302 at least partially surrounds the intermediate slide segment 304. Preferably, upper and lower portions of the outer slide segment 302 wrap around upper and lower portions of the intermediate segment 304. The ball bearings 350 are held between the bearing surfaces of the outer slide segment 302 and intermediate slide segment 304. Upper and lower surfaces of the outer slide segment 302 can be angled toward a center of the slide assembly 300 when moving from an outboard side toward and inboard side of the slide assembly 300.

As discussed above, in a preferred embodiment, at least each of the slide segments 302 and 304 is constructed from aluminum material by a precision extrusion process to gain the advantages of embodiments 20 and 200, discussed previously. Precision extrusion allows the slide segments to have very complex cross-sections and shapes. Preferably, the cross-section of the intermediate segment 304 does not have a uniform thickness and is thicker is some areas in order to provide added strength (in contrast to a roll-formed segment with uniform wall thickness, for example).

As illustrated in FIG. 26, preferably, an upper portion of the intermediate segment 304 includes a U-shaped portion 310, or upper flange, that surrounds an upper portion of the inner segment 306. Another U-shaped portion 310, or lower flange, at the lower portion of the intermediate segment 304 surrounds a lower portion of the inner segment 306. A web portion 312 extends between the upper and lower U-shaped portions 310. The cross-section of the intermediate segment 304 is thinner at the web 312 relative to the upper and lower portions 310. The horizontal portions 314 of the U-shaped portions 310 are thicker than the vertical portions 316. Preferably, the vertical portions 316 are thicker than the web 312. Preferably, the intermediate segment cross-section 304 is designed to include an optimized and/or maximum amount of material without increasing the outer dimensions of the slide assembly 300.

As a result of the above-described construction, the intermediate segment 304 has a cross-section that is filled in with additional material in comparison to a typical roll-formed segment, which has a constant wall thickness that is doubled over onto itself to increase strength. Thus, with a conventional roll-formed segment, the only available material thickness is the actual wall thickness or multiples thereof. In contrast, the cross-sectional shape of at least the intermediate segment 304 can be manipulated as desired using a precision extruding process to optimize the strength properties of the segment 304. The intermediate segment 304 is typically the segment that carries the highest load in the slide assembly 300 and benefits most from the shapes permitted by the extrusion process. However, the other slide segments 302 and 306 can also be constructed with an extrusion process, if desired. However, in the illustrated slide assembly 300, the inner slide segment 306 is constructed from roll-formed steel. The additional material, and especially the thick areas at the upper and lower portions of the cross-section, adds significant strength against bending along the slide assembly's longitudinal axis. This added strength greatly reduces deflection of the slide assembly under a force or weight of a supported object. During testing, the slide assembly 300 was determined to have significantly lower deflection values compared to a benchmark 1U slide assembly having similar cross-sectional dimensions and constructed from roll-formed steel.

Figure 24:
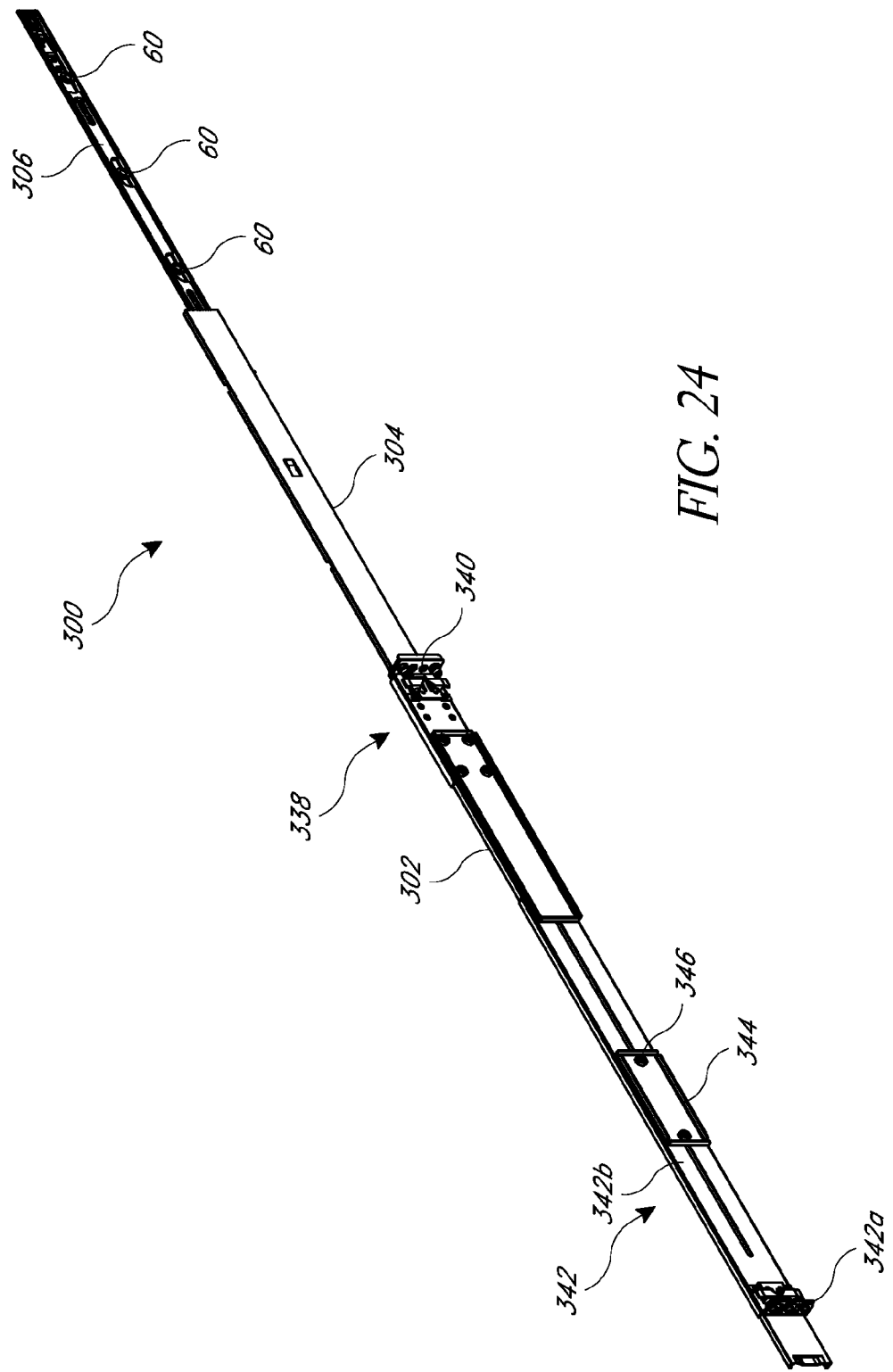
FIG. 24 is a perspective view of an outboard side of the slide assembly of FIG. 23.
Figure 25:
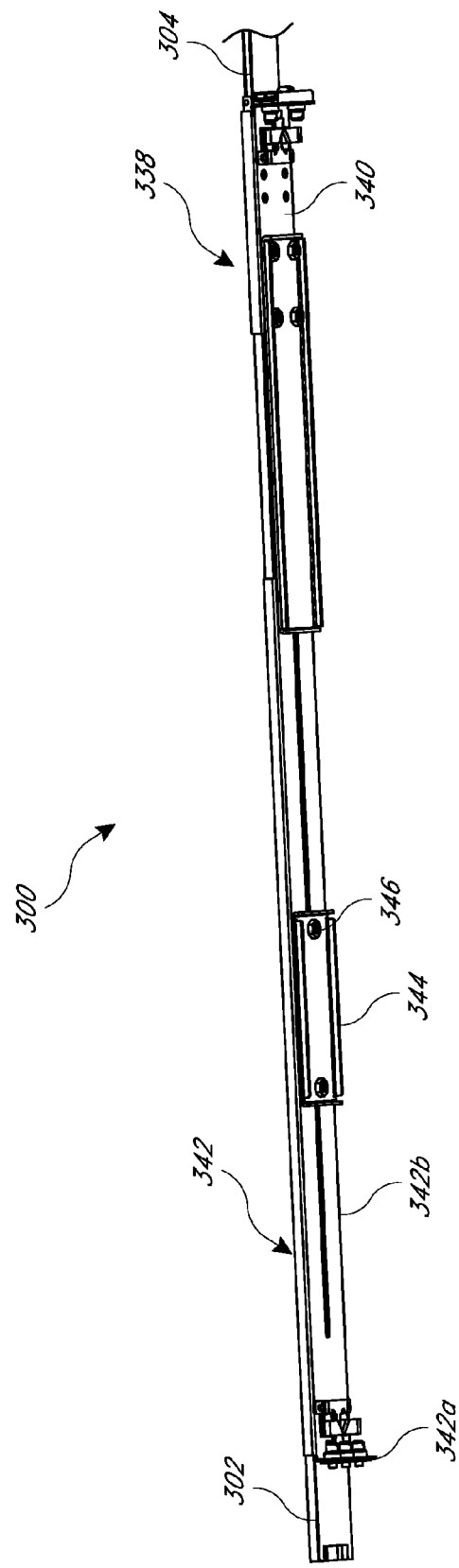
FIG. 25 is a perspective view of a rearward portion of the slide assembly of FIG. 23.

With primary reference to FIG. 24, preferably, the slide assembly 300 also includes a mounting arrangement 338, which can include couplings or brackets used to mount the slide assembly 300 to a server rack or other structure. Preferably, the mounting arrangement 338 is similar to the mounting arrangements of slide assemblies 20 and 200 as discussed above. In particular, the mounting arrangement 338 includes a forward bracket 340 attached to a forward end of the slide assembly 300 (e.g., the outer segment 302) and a rearward bracket 342 that is movable relative to the slide assembly 300 (e.g., the outer segment 302) to permit length adjustment of the mounting arrangement 338. The rearward bracket 342 includes a lateral flange 342a and an elongate channel portion 342b. The channel 342b at least partially surrounds the slide assembly 300 (e.g., the outer segment 302) and is slidable thereon. In the illustrated arrangement, the channel 342b is also inwardly angled (toward a center of the slide assembly 300) to conform to the shape of the outer slide segment 302 and inhibit lateral separation of the channel 342b from the outer slide segment 302. In addition, a mount plate 344 is attached to the slide assembly 300 (e.g., the outer segment 302) by one or more fasteners 346 with the channel 342b interposed between the mount plate 344 and the slide assembly 300 (e.g., the outer segment 302). Preferably, at least two fasteners 346 are provided at spaced locations from one another to further increase the strength and adjustability of the mounting arrangement 338.

Similar to the slide assemblies 20, 200 described above, the slide assembly 300 is configured to support an object, such as a computer server. In a preferred embodiment, the inner segment 306 includes a plurality of slots 350, which receive mounting pins or rivets provided on the computer server (not shown—preferably similar to pins or rivets 140 of FIG. 13). Preferably, the mounting pins include a head portion and a smaller shaft portion. The upper end of each of the slots 350 defines an opening 352 configured to allow both a head portion and a shaft portion of the mounting pin to pass into the slot 350. Preferably, the slot 350 then receives the shaft portion of the mounting pin. The inner segment 306 preferably includes more than one slot 350 and may include two, three, four or more slots 350 configured to receive mounting pins. Preferably, the slots 350 are generally or substantially L-shaped or J-shaped so that the mounting pin enters the slot 350 at an upper end (through the opening 352) and drops downward into a secure position. The illustrated arrangement includes four slots 350, a portion (e.g., two) of which are located within a section of the inner segment 306 that resides within the intermediate segment 304 when the slide assembly 30 is in an open position. Accordingly, the intermediate segment 304 can include access passages 354 that are aligned with the slots 350 and permit passage of the mounting pins through the access passage 354 and into the slot 350.

Figure 28:
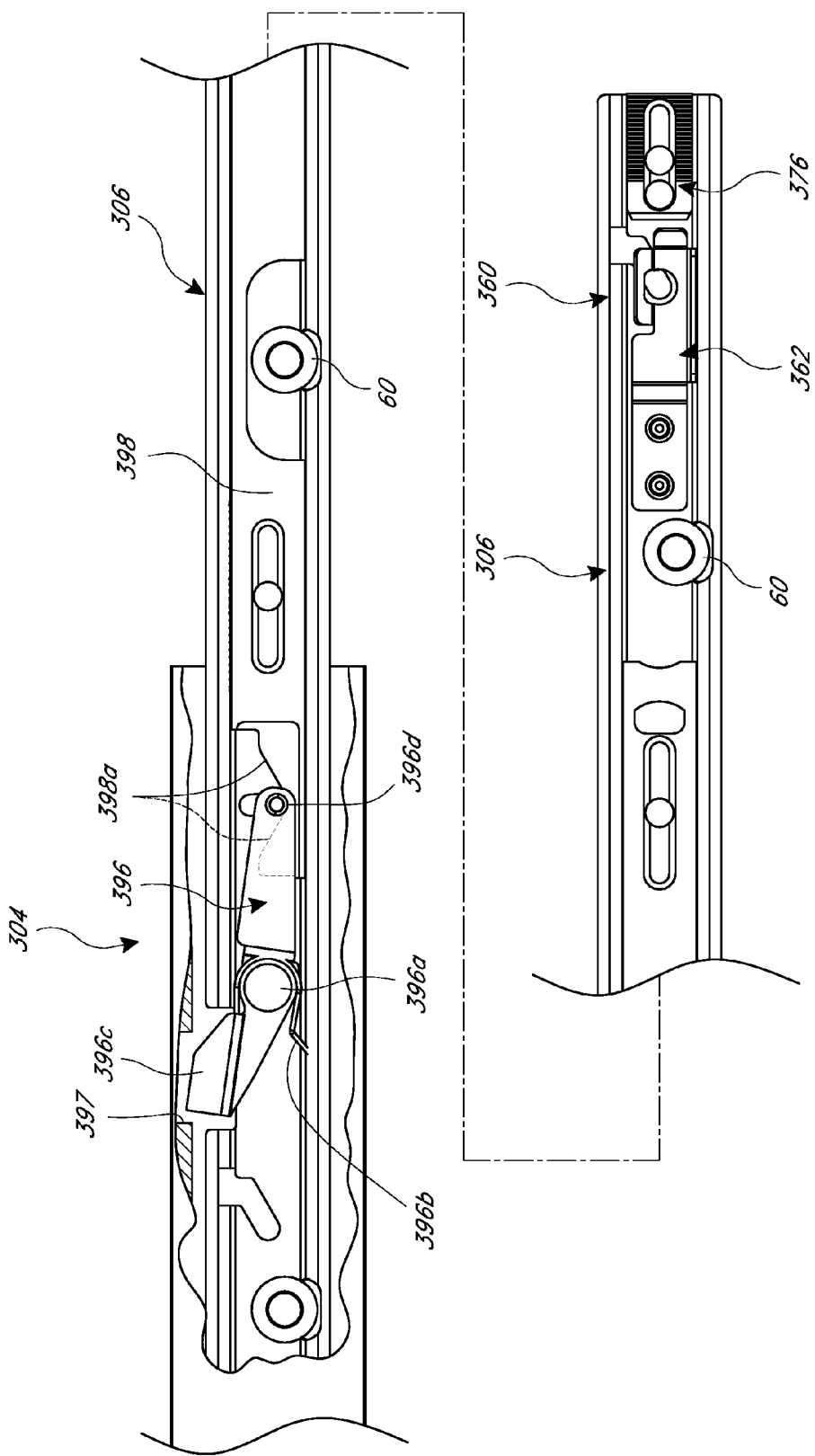
FIG. 28 is a side view of an outboard side of a forward portion of the slide assembly of FIG. 23.
Figure 30:
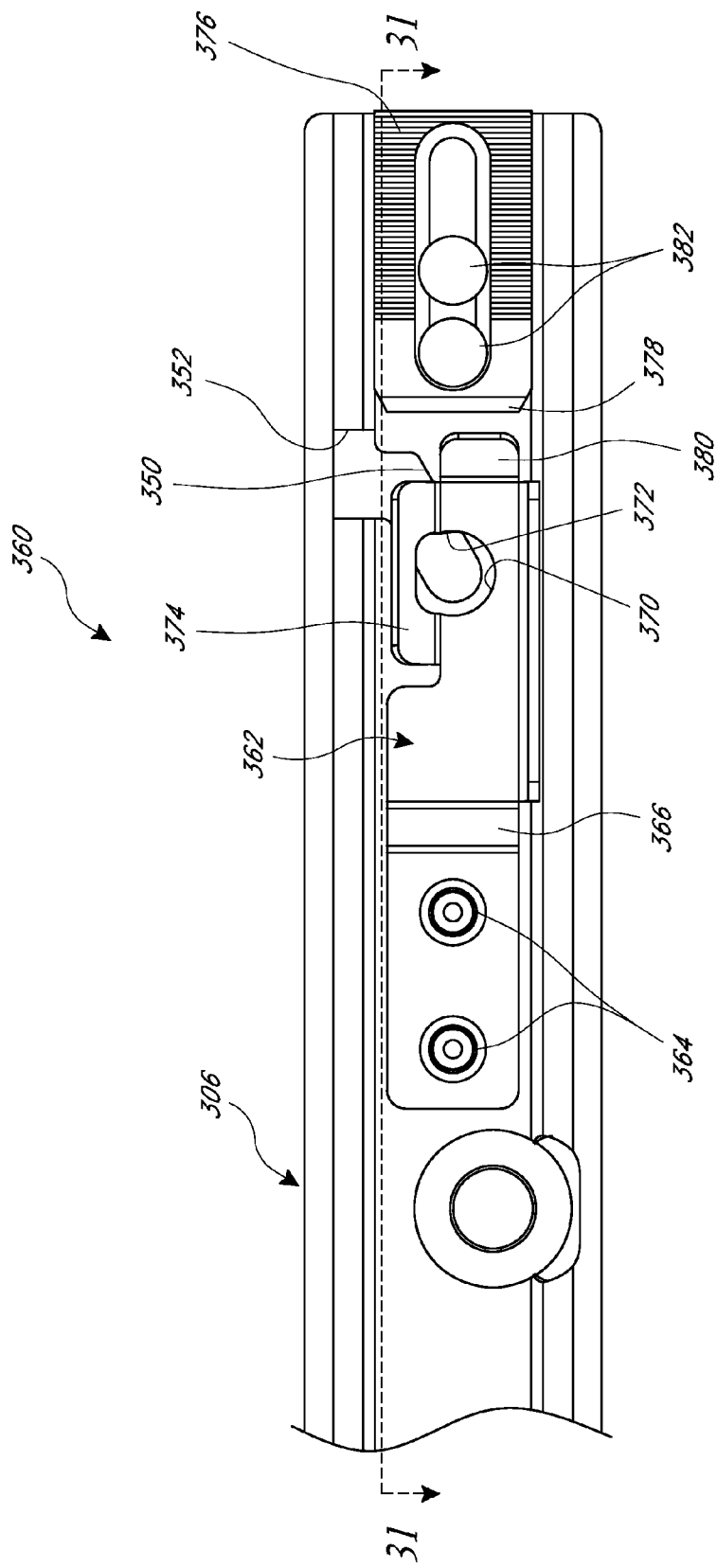
FIG. 30 is a side view of a portion of a retention assembly that secures a mounting pin within a keyhole of the slide assembly of FIG. 23.
Figure 31:
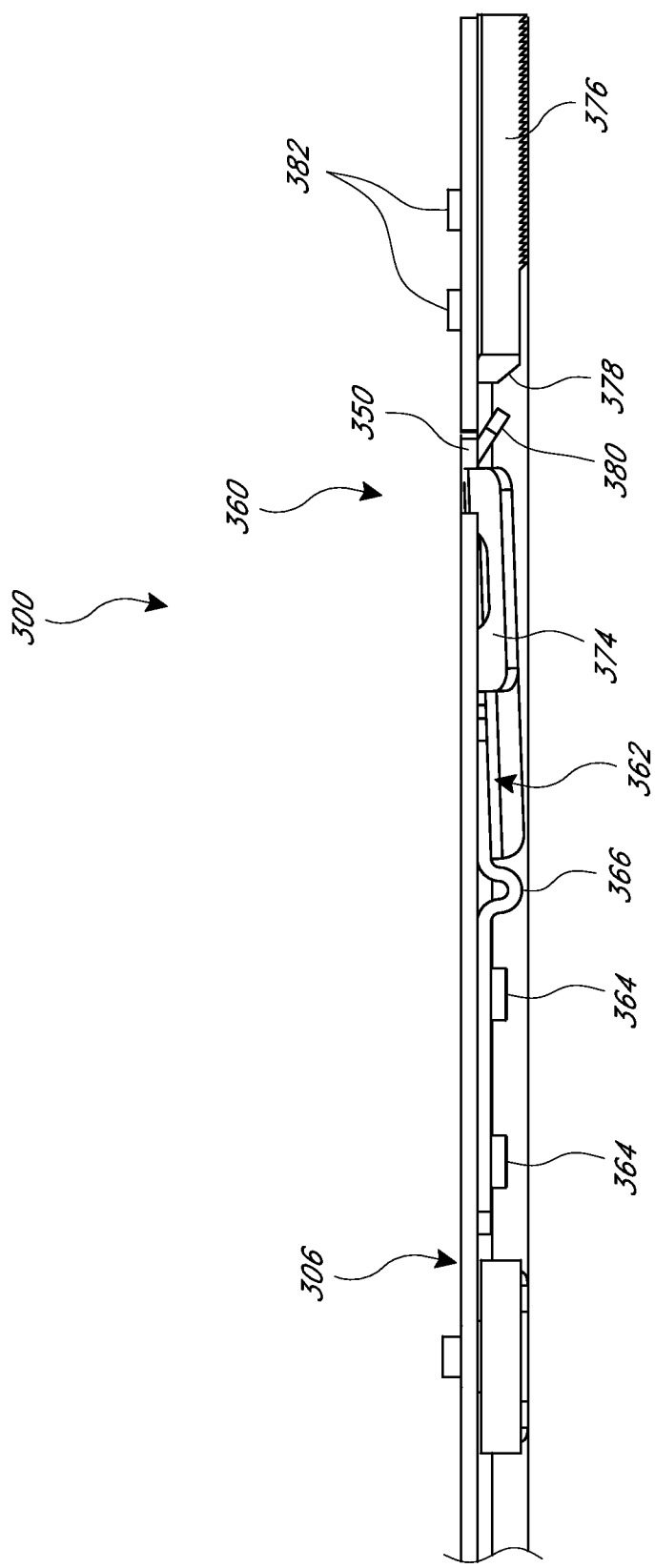
FIG. 31 is a cross-sectional view of the retention assembly of FIG. 30.

With reference to FIGS. 28, 30 and 31, preferably, the inner slide segment 306 includes a locking mechanism 360 corresponding to one or more of the slots 350. Preferably, the locking mechanism 360 includes a locking element, such as a lock arm or spring arm 362, which can selectively secure a mounting pin within the associated slot 350. The illustrated spring arm 362 is an elongated flexible member that extends along an outboard side surface of the inner slide segment 306. One end (e.g., a rearward end) of the spring arm 362 is secured to the inner slide segment 306 by a suitable fastening arrangement, such as one or more fasteners. Two rivets 364 are used in the illustrated arrangement and are spaced from one another in a length direction of the slide assembly 300. The other end of the spring arm 362 is free to move in a lateral direction relative to the inner slide segment 306 and includes features that permit entry of a mounting pin into the closed end of the slot 350 and inhibit undesired removal of the mounting pin. The spring arm 362 is normally biased to a closed position (e.g., adjacent the inner slide segment 306) and can be selectively moved to an open position (e.g., away from the inner slide segment 306) to permit removal of the mounting pin. A flex zone 366 can be provided to facilitate flexing of the spring arm 362 and reduce stress and fatigue. The illustrated flex zone 366 includes a semi-cylindrical bend between the secured end and the free end of the spring arm 362.

In particular, the free end of the spring arm 362 includes an opening 370 that is sized to permit a head of the mounting pin to pass therethrough in a lateral direction. Preferably, the opening 370 is completely enclosed. In other words, the opening 370 is completely surrounded by material of the spring arm 362. A portion of the spring arm 362 surface defining the opening 370 also defines a stop surface 372 that, when the mounting pin is present within the closed end of the slot 350, blocks the slot 350 to inhibit removal of the mounting pin from the slot 350. An upwardly-facing angled tab 374 extends in an outboard direction from the remainder of the spring arm 362. The angled tab 374 is configured to be contacted by the head of the mounting pin upon entry of the mounting pin into the slot 350. Movement of the mounting pin toward the closed end of the slot 350 biases the spring arm 362 toward the open position and allows the mounting pin to pass into the closed end of the slot 350. Once the head of the mounting pin is aligned with the opening 370, the spring arm 362 can move back to the closed position, with the head of the mounting pin passing through the opening 370. The stop surface 372 then inhibits removal of the mounting pin from the slot 350. Such an arrangement is often referred to as a "drop and lock" arrangement because the server (or other object) with mounting pins can be "dropped" into engagement with the slots 350 of the inner slide segment(s) 306 and automatically locked in place.

In a preferred embodiment, the inner segment 306 also includes a release member 376 configured to selectively release the mounting pin from the slot 350 by moving the spring arm 362 to the open position. Preferably, the release member 376 includes a ramped contact surface 378 that engages a forwardly-extending angled release tab 380 of the spring arm 362. The release tab 380 extends in an outboard direction from the remainder of the spring arm 362. Rearward movement of the release member 376 moves the spring arm 362 toward the open position to allow the mounting pin to be removed from the slot 350. The spring tension of the spring arm 362 can hold the release member 376 via frictional force in a rearward position thus maintaining the spring arm 362 in the open position. Preferably, the frictional force generated by the spring arm 362 is the only force utilized to hold the release member 376 in the rearward position and no additional holding or biasing members are provided. Accordingly, the server (or other object) can be removed from engagement with the inner slide segment 306 without requiring the release member 376 to be manually held in a rearward (releasing) position. Preferably, as the mounting pin is removed from the slot 350, it contacts the ramped surface 378 and moves the release member 376 back to a forward position, which allows the spring arm 362 to move back to the closed position. Thus, the locking mechanism 360 is reset and ready to receive a mounting pin within the slot 350. This can be referred to as a "self-resetting hands-free" disconnect arrangement.

The release member 376 can be of any suitable arrangement. In the illustrated arrangement, the release member 376 is slidably supported relative to the inner slide segment 306. In particular, the release member 376 is supported by a pair of spaced fasteners, such as pins or rivets 382. The release member 376 can include a plurality of ridges or other roughened surface features to enhance friction during manual movement of the release member 376. Accordingly, it is not necessary to provide laterally extending finger grip features and a narrow profile of the release member 376 can be maintained. As illustrated, the inner segment 306 may include a single locking mechanism 360 and release member 376 adjacent to one slot 350, such as the forward-most slot, for example. A single locking mechanism 360 and release member 376 may be configured adjacent to any one of the slots 350 on the inner segment 306. Alternatively, the inner segment 306 may include more than one locking mechanism 360 and release member 376 at various slots 350.

Figure 29:
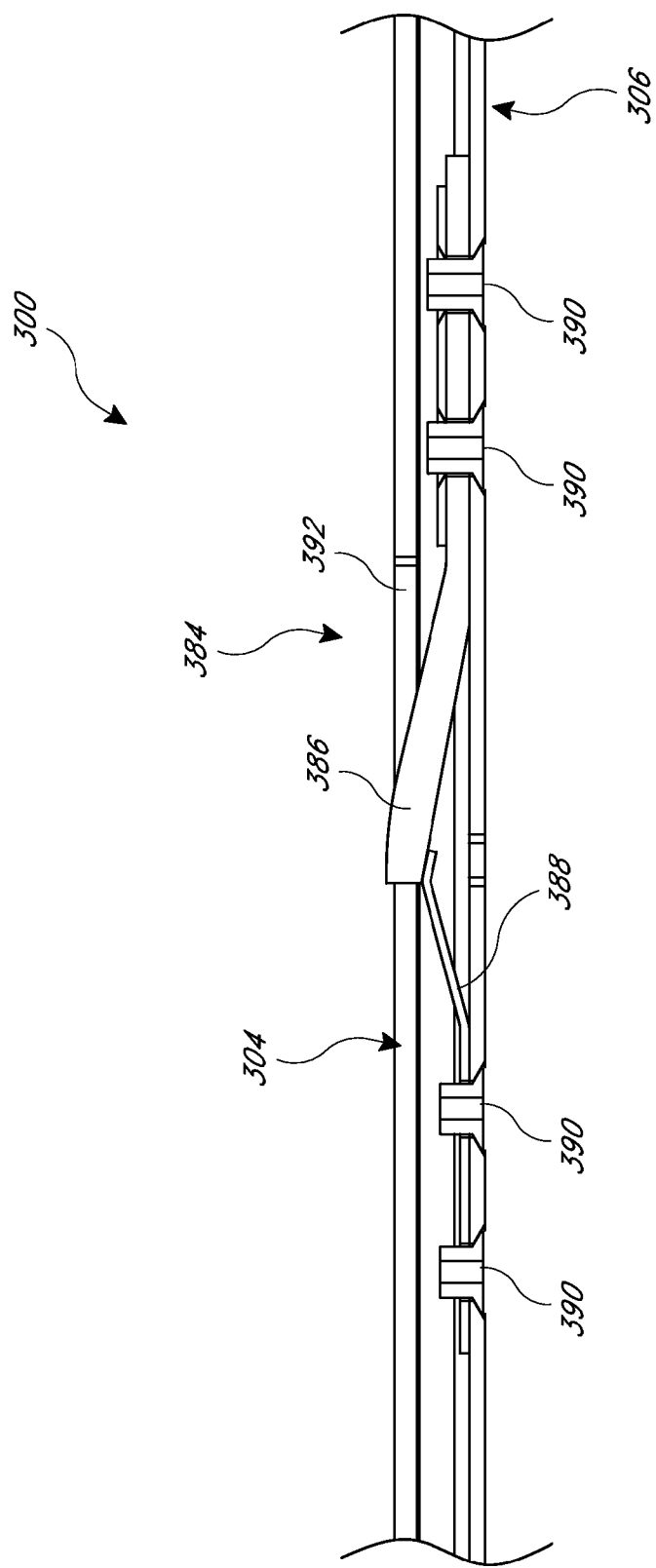
FIG. 29 is a cross-sectional view of a releasable lock assembly that secures an inner slide segment in an open position and is releasable to permit removal of the inner slide segment from the remainder of the slide assembly of FIG. 23.

Preferably, the inner slide segment 306 is also removable, or disconnectable, from the intermediate slide segment 304. Thus, the illustrated slide assembly 300 also includes a disconnect lock arrangement 384 (FIG. 29). The disconnect lock 384 locks the inner slide segment 306 in an extended or open position relative to the intermediate slide segment 304 and inhibits further opening or removal of the inner slide segment 306. However, the disconnect lock 384 can be selectively released to permit the removal of the inner slide segment 306 from the intermediate slide segment 304. As a result, the server (or other object) can either be engaged with the inner slide segment 306 (inserted into the slots 350) while the inner slide segment(s) 306 are open and still assembled to the intermediate and outer slide segments 304, 302 ("drop-in" or "drop and lock" if a lock is employed) or the inner slide segment 306 can be removed from the intermediate slide segment 304 and assembled to the server (or other object) and then the server with installed inner slide segment(s) 306 can be re-assembled to the intermediate slide segment 304 (referred to as a "stab-in" assembly). Thus, the present slide assembly 300 allows convenient mounting options for a variety of applications, environments and user preferences. Typical slide assemblies only provide for one or the other of "drop-in" or "drop and lock" and "stab-in" assembly.

The illustrated disconnect lock 384 includes a lock member 386 and a biasing member 388 that biases the lock member 386 toward a locked position. The lock member 386 is an elongated, flexible lock arm that is secured to the inner slide segment 306. The biasing member 388 is an elongated spring arm that is secured to the inner slide segment 306 and contacts the lock member 386 to apply a biasing force tending to move the lock member 386 toward a locked position, or in an outboard direction toward the intermediate slide segment 304. In the illustrated arrangement, each of the lock member 386 and biasing member 388 is secured to the inner slide segment 306 by a pair of fasteners, such as rivets 390. However, other suitable fasteners or fastening arrangements can also be used. When the inner slide segment 306 is opened relative to the intermediate slide segment 304, the biasing member 388 biases the lock member 386 into engagement with an opening 392 in the intermediate slide segment 304 to inhibit further opening or removal of the inner slide segment 306 from the intermediate slide segment 304. A portion of the lock member 386 is accessible through the opening 392 of the intermediate slide segment 304 and can be manually moved out of engagement with the opening 392 such that the inner slide segment 306 can be separated or removed from the intermediate slide segment 304. However, other arrangements are possible wherein a release member is provided that is manually or automatically operable to contact and release the lock member 386.

With reference to FIG. 28, the slide assembly 300 can include one or more lock arrangements to secure segments 302, 304, 306 of the slide assembly 300 in desirable positions relative to one another. For example, the slide assembly 300 can include a lock arrangement 394 that secures the inner slide segment 306 in an open position relative to the intermediate slide segment 304 and inhibits or prevents closure of the inner slide segment 306 until the lock is released. This can be referred to as a "lock open" arrangement.

Preferably, the lock arrangement 394 is substantially similar to the lock arrangement 82 of the slide assembly 20 (FIG. 4). In particular, the lock arrangement 394 includes a lock arm or latch 396 that is pivotally supported relative to the inner slide segment 306, such as by a rivet or pin 396a. The lock arrangement 394 can include a biasing element, such as a spring 396b that applies a force tending to bias the latch 396 toward a locked position (clockwise in FIG. 28). When the inner slide segment 306 is open, an engagement portion 396c of the latch 396 enters an opening 397 of the intermediate slide segment 304 in response to the biasing force of the spring 396b to inhibit at least rearward (closing) movement of the inner slide segment 306. A release member 398 can be provided to selectively move the latch 396 to an unlocked position (counter-clockwise in FIG. 28). Preferably, the release member 398 is slidably mounted to the inner slide segment 306 and includes at least one ramped surface 398a that engages the latch 396. In particular, preferably, two ramped surfaces 398a are provided that are configured to engage an engagement pin 396d of the latch 396. The release member 398 can be moved in either a forward or rearward direction such that one of the ramped surfaces 398a contact the engagement pin 396d to rotate the latch 396 to an unlocked position such that the inner slide segment 306 can be closed relative to the intermediate slide segment 304. In the illustrated arrangement, the release member 398 is an elongated strip-like member that extends from a forward end of the intermediate slide segment 304, along a substantial length of the exposed portion of the inner slide segment 306, to near a forward end of the inner slide segment 306. Accordingly, the forward end of the release member 398 is easily accessible to a user of the slide assembly 300. The release member 398 can include cut-out portions to accommodate components of the slide assembly 300, such as the rollers 60.

Installation and operation of slide assembly 300 are preferably similar to the installation and operation of the slide assembly 20 and 200 described above. However, the installation and operation may vary to the extent that the particular embodiment of the slide assembly 300 differs from the slide assemblies 20 and 200.

Figure 32:
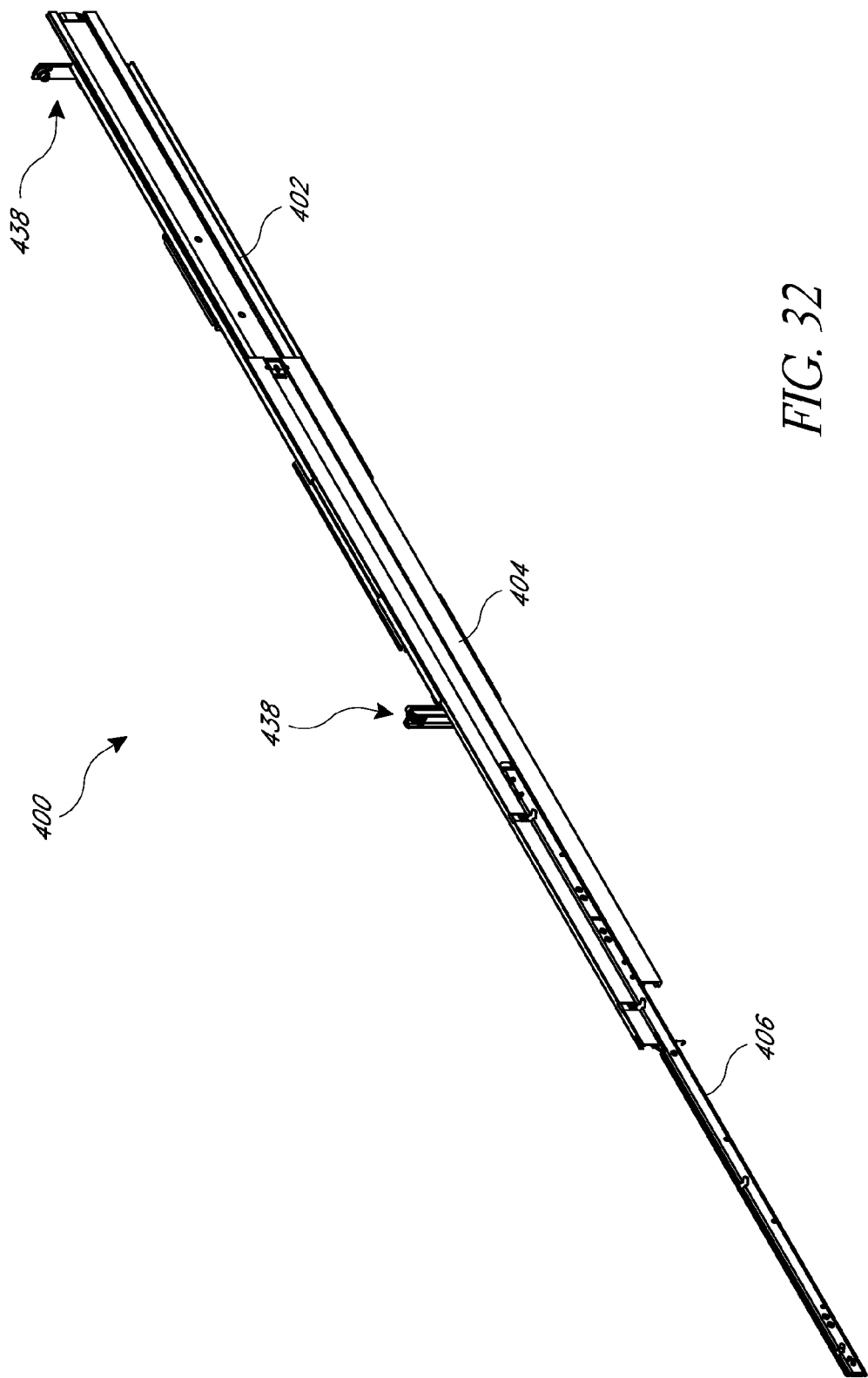
FIG. 32 is a perspective view of an inboard side of a fourth slide assembly.
Figure 33:
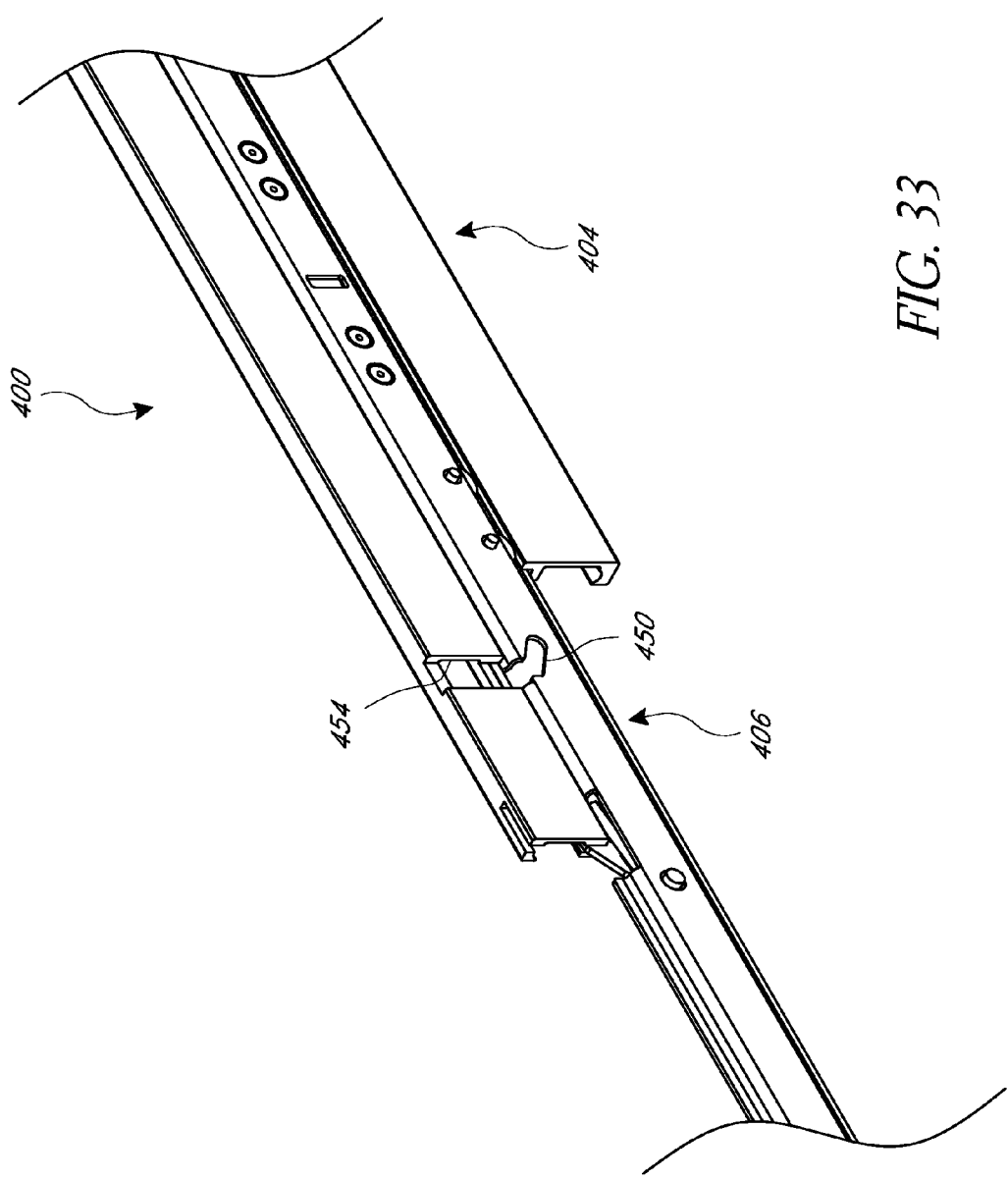
FIG. 33 is a perspective view of an intermediate portion of the inboard side of the slide assembly of FIG. 32.
Figure 34:
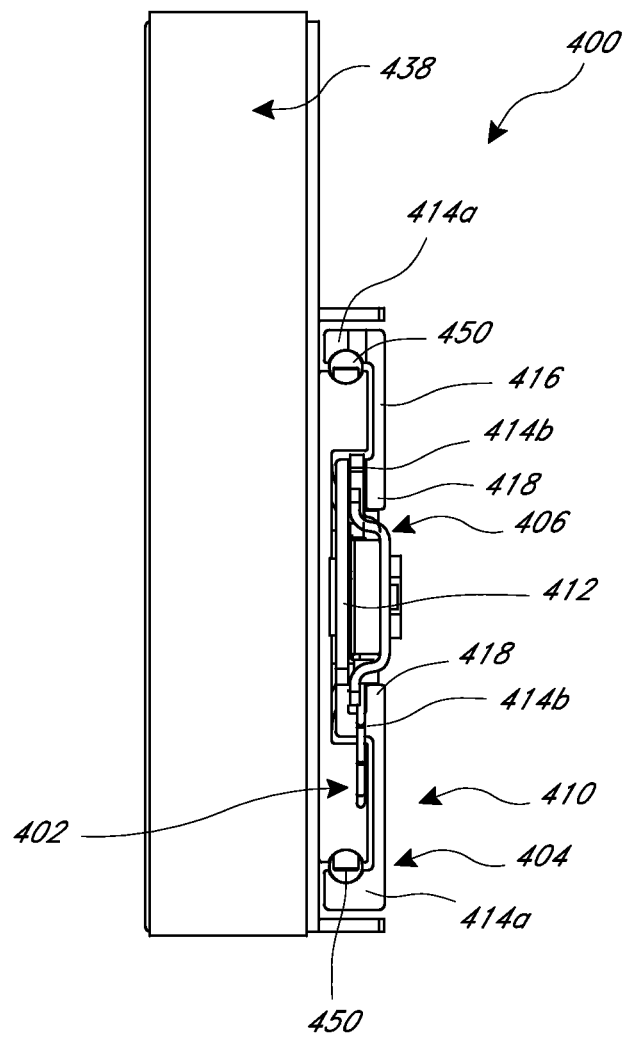
FIG. 34 is a front view of the slide assembly of FIG. 32.

FIGS. 32-34 illustrate a preferred slide assembly 400 that is similar to the previous slide assemblies 20, 200 and 300. The illustrated slide assembly 400 is a taller configuration arranged to be used in a 2U (2 rack unit) server structure. The taller slide assembly 400 includes similar features and members as the smaller 1U slide assembly of FIGS. 23-31, and it is arranged to perform the same or similar functions. Accordingly, certain features of the slide assembly 400 are described by reference to corresponding features of the other slide assemblies 20, 200 and 300. Preferably, slide assembly 400 includes three segments: an outer slide segment 402, an intermediate slide segment 404 and an inner slide segment 406. However, in some embodiments, the slide assembly 400 may include two segments, four segments, or more than four segments. In a preferred embodiment, at least portions of the slide assembly are made of aluminum material (e.g., at least segments 402 and 404) by a precision extrusion process to gain the advantages of embodiments 20, 200 and 300, discussed previously. However, in other arrangements, other suitable materials (including other types of metal, plastics, etc.) may be utilized. Precision extrusion allows the slide segments to have very complex cross-sectional shapes. Preferably, the cross-section of the intermediate segment 404 does not have a uniform thickness and is thicker is some areas in order to provide added strength (in contrast to a roll-formed segment with uniform wall thickness, for example), as discussed.

The slide assembly 400 is arranged so that the slide segments 402, 404 and 406 can slide in relation to one another in a telescopic arrangement, as discussed in the previous slides. Preferably, the intermediate slide segment 404 is supported for movement relative to the outer slide segment 402 by a plurality of bearings and, in particular, ball bearings 450. As illustrated, the ball bearings 450 are loosely carried between the bearing surfaces of the outer slide segment 402 and intermediate slide segment 404. Preferably, forward and rearward stops inhibit the ball bearings from exiting this space, as described in the previous embodiments. Preferably, the inner slide segment 406 is supported for movement relative to the intermediate slide segment 404 by a plurality of rollers, as described in the previous embodiments. The slide assembly 400, also preferably includes multiple locks, which operate to secure segments in desirable positions relative to one another as described in slide assemblies 20, 200 and 300 above.

In slide assembly 400, a portion of the intermediate slide segment 404 at least partially surrounds the outer slide segment 402. Preferably, upper and lower portions of the intermediate segment 404 wrap around upper and lower portions of the outer segment 402. In a preferred embodiment, an upper portion of the intermediate segment 404 includes a C-shaped portion 410 that at least partially surrounds an upper portion of the outer segment 302. Another C-shaped portion 410 at the lower portion of the intermediate segment 404 also at least partially surrounds the lower portion of the outer segment 402. A web portion 412 extends between the upper and lower C-shaped portions 410. The cross-section of the intermediate segment 404 is thinner at the web 412 relative to the upper and lower portions 410. Horizontal portions 414a, 414b of the C-shaped portions 310 are thicker than the vertical portions 416. Preferably, the vertical portions 416 are substantially the same thickness as the web 412, but could be thicker or thinner in other arrangements. Preferably, the cross-sectional shape of the intermediate segment 404 is designed to include an optimized and/or maximum amount of material without increasing the outer dimensions of the slide assembly 400. Preferably, the intermediate segment 404 includes portions 418 that at least partially surround upper and lower portions of the inner segment 406. The intermediate segment 404 is taller and therefore stronger than other typical embodiments because it extends around upper and lower portions of outer segment 402. This arrangement can be referred to as an "over-under" intermediate slide segment 404. Therefore, the intermediate segment 304 is not only taller, but it also has a cross-section that is filled in with additional material. The additional material, and especially the thick areas at the upper and lower portions of the cross-section, adds significant strength against bending along the slide assembly's longitudinal axis. This added strength greatly reduces deflection of the slide assembly under a force or weight of a supported object.

Preferably, the slide assembly 400 also includes a mounting arrangement 438, which can include couplings or brackets used to mount the slide assembly 400 to a server rack or other structure. Preferably, the mounting arrangement 438 is similar to the mounting arrangements of slide assemblies 20, 200 and 300 as discussed above.

The slide assembly 400 is preferably configured to support an object, such as a computer server. The inner segment 406 of the slide assembly 400 may include a plurality of slots 450 similar to the slots 350 described in connection with the slide assembly 300. With reference to FIG. 33, the intermediate segment 404 includes slots 454 that permit mounting pins of the server (or other object) to pass therethrough and into the slots 450 of the inner segment 406. In addition, the slide assembly 400 may include a locking mechanism that preferably is similar to or the same as the locking element 360 described above. Alternatively, the inner segment 406 may include a plurality of keyholes similar to those described previously.

The slide assembly 400 can also include a disconnect lock similar to the disconnect lock 384 and a lock-open lock arrangement similar to or the same as the lock-open lock arrangement 394 discussed above in connection with the slide assembly 300. The slide assembly 400 can also include a lock-closed arrangement similar to or the same as the lock-closed arrangement 120 of the slide assembly 20.

Installation and operation of slide assembly 400 are preferably similar to the installation and operation of the slide assemblies 20, 200 and 300 described above. However, the installation and operation may vary to the extent that the particular embodiment of the slide assembly 400 differs from the slide assemblies 20, 200 and 300.

As illustrated, the slide assembly 400 can be constructed in various sizes including sizes corresponding to 1U, 2U, 3U, 4U, 5U, 6U and larger server arrangements. Each of the embodiments described herein can be constructed and sized to a desired server size/arrangement and each embodiment may also be constructed and sized to other applications outside of computers and servers.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present slide assemblies have been described in the context of particularly preferred embodiments, the skilled artisan will appreciate, in view of the present disclosure, that certain advantages, features and aspects of the assemblies may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A slide assembly, comprising:
an outer slide segment having a first bearing surface and a second bearing surface;
at least one intermediate slide segment telescopically engaged with the outer slide segment, the at least one intermediate slide segment having a first bearing surface, a second bearing surface, a third bearing surface and a fourth bearing surface;
an inner slide segment telescopically engaged with the at least one intermediate slide segment;
a plurality of first bearing members directly contacting the first bearing surface of the outer slide segment and the first bearing surface of the at least one intermediate slide segment;
a plurality of second bearing members directly contacting the second bearing surface of the outer slide segment and the second bearing surface of the at least one intermediate slide segment, wherein the first and second bearing surfaces of each slide segment carry a load applied by the other slide segments; and
a plurality of rollers fixed to the inner slide segment by an axle and dispersed along a length of the inner slide segment, each of the rollers extending through openings in the inner slide to contact the at least one intermediate slide segment, wherein each of the plurality of rollers transfers load to the third or fourth bearing surfaces of the at least one intermediate slide segment depending on a position of the inner slide segment with respect to the at least one intermediate slide segment,
wherein the outer slide segment and the at least one intermediate slide segment are constructed from an aluminum material and shaped into a desired cross-sectional shape by a precision extrusion process such that the bearing surfaces of the outer and at least one intermediate slide segments are aluminum and are extruded into a finished shape and wherein a wall thickness of upper and lower portions defining the bearing surfaces is greater than a wall thickness of a web portion extending between the upper and lower portions, and wherein the inner slide segment is constructed from a steel material, wherein the slide assembly is a hybrid including one or more aluminum segments and one or more steel segments.

2. The slide assembly of claim 1, wherein the outer slide segment and the at least one intermediate slide segment are made from 6061 aluminum material.

3. The slide assembly of claim 2, wherein the at least one intermediate slide segment comprise a first slide segment and a second slide segment.

4. The slide assembly of claim 1, wherein the inner slide segment is shaped by a roll forming process.

5. The slide assembly of claim 1, further comprising a mounting arrangement comprising a first channel telescopically engaged with a second channel to allow an overall length of the first and second channels to be adjusted, and first and second brackets that permit mounting to a computer server rack.

6. The slide assembly of claim 1, further comprising one or more locks to secure the segments in selected positions relative to one another.

7. The slide assembly of claim 6, wherein one of the locks secures the inner slide segment in a partially open position relative to the at least one intermediate slide segment.

8. The slide assembly of claim 1, further comprising a mounting bracket coupled to the outer slide segment, wherein the mounting bracket is connectable to a server rack having a rail with a plurality of mounting holes, and a locked-closed arrangement comprising a lock arm carried by the inner slide segment, wherein the lock arm extends through one of the plurality of mounting holes and comprises an engagement portion that retains the inner slide segment in the closed position and an engaged position of the lock arm.

9. The slide assembly of claim 8, wherein the mounting bracket comprises a first mounting pin and a second mounting pin configured to engage a pair of the plurality of mounting holes of the server rack, wherein the one mounting hole of the plurality of mounting holes is located between the pair of mounting holes.

10. The slide assembly of claim 1, wherein the outer slide segment is monolithic and the at least one intermediate segment is monolithic.

11. The slide assembly of claim 1, the at least one intermediate slide segment further comprising at least one U-shaped portion, wherein at least one of an upper portion or a lower portion of the inner slide segment is positioned within the at least one U-shaped portion.

12. The slide assembly of claim 11, wherein the at least one U-shaped portion slidingly contacts the upper portion or the lower portion of the inner slide segment to limit lateral movement of the inner slide segment.

13. A slide assembly, comprising:
an outer slide segment having a first bearing surface and a second bearing surface;
at least one intermediate slide segment telescopically engaged with the outer slide segment, the at least one intermediate slide segment having a first bearing surface and a second bearing surface;
an inner slide segment telescopically engaged with the at least one intermediate slide segment;
wherein the first and second bearing surfaces of each slide segment carry a load applied by the other slide segments;
wherein the outer slide segment and the at least one intermediate slide segment are constructed from an aluminum material and shaped into a desired cross-sectional shape by a precision extrusion process such that the bearing surfaces of the outer and at least one intermediate slide segments are aluminum and are extruded into a finished shape and wherein a wall thickness of upper and lower portions defining the bearing surfaces is greater than a wall thickness of a web portion extending between the upper and lower portions, and wherein the inner slide segment is constructed from a steel material;
further comprising a mounting bracket coupled to the outer slide segment, wherein the mounting bracket is connectable to a server rack having a rail with a plurality of mounting holes, and a locked-closed arrangement comprising a lock arm carried by the inner slide segment, wherein the lock arm is configured to extend through one of the plurality of mounting holes of the rail that is aligned with the opening and comprises an engagement portion that contactingly engages the mounting bracket and retains the inner slide segment in the closed position and an engaged position of the lock arm; and
wherein the lock arm is rotatably coupled to the inner slide segment about an axis that extends in a lateral direction that is perpendicular to a length of the inner slide segment.

14. The slide assembly of claim 13, further comprising a retention member comprising a spring arm that contacts the lock arm when the inner slide segment is in the closed position and urges the lock arm into the engaged position.

* * * * *